(12) United States Patent
Ikeda

(10) Patent No.: US 11,902,061 B2
(45) Date of Patent: Feb. 13, 2024

(54) RECEPTION DEVICE AND RECEPTION METHOD

(71) Applicant: Kioxia Corporation, Tokyo (JP)

(72) Inventor: Shinichi Ikeda, Fujisawa (JP)

(73) Assignee: Kioxia Corporation, Tokyo (JP)

( * ) Notice: Subject to any disclaimer, the term of this patent is extended or adjusted under 35 U.S.C. 154(b) by 56 days.

(21) Appl. No.: 17/840,684

(22) Filed: Jun. 15, 2022

(65) Prior Publication Data

US 2023/0308320 A1    Sep. 28, 2023

(30) Foreign Application Priority Data

Mar. 22, 2022  (JP) ................................. 2022-045660

(51) Int. Cl.
*H04L 25/03*    (2006.01)

(52) U.S. Cl.
CPC .. *H04L 25/03949* (2013.01); *H04L 25/03025* (2013.01); *H04L 25/03063* (2013.01); *H04L 2025/03471* (2013.01)

(58) Field of Classification Search
CPC ......... H04L 25/03949; H04L 25/03025; H04L 25/03063; H04L 2025/03471
See application file for complete search history.

(56) References Cited

U.S. PATENT DOCUMENTS 9,806,699 B2 * 10/2017 Bulzacchelli ..... H04L 25/03057
10,476,706 B2 * 11/2019 Kitazawa ......... H04L 25/03057
10,536,303 B1 * 1/2020 Pike ....................... H03K 5/135
2021/0184726 A1  6/2021 Shiroshita
2022/0400036 A1 * 12/2022 Ko ................... H04L 25/03057

FOREIGN PATENT DOCUMENTS

| JP | 05-235791 A | 9/1993 |
| JP | 08-018492 A | 1/1996 |
| JP | 2021-132239 A | 9/2021 |

OTHER PUBLICATIONS

Chi et al., "An 8.5Gb/s/pin 12Gb-LPDDR5 SDRAM with a Hybrid-Bank Architecture using Skew-Tolerant, Low-Power and Speed-Boosting Techniques in a $2^{nd}$ generation 10nm DRAM Process", 2020 IEEE International Solid-State Circuits Conference / Session 22/ DRAM & High-Speed Interfaces/ 22.2, pp. 332-334, 2020.

* cited by examiner

*Primary Examiner* — Dac V Ha

(74) *Attorney, Agent, or Firm* — Oblon, McClelland, Maier & Neustadt, L.L.P.

(57) ABSTRACT

A reception device for receiving a data signal representing a data value 0 or 1. The reception device includes an equalizer circuit and a control circuit. The equalizer circuit outputs an output value representing a result obtained by comparing a voltage based on the received data signal and a first voltage as a reference, at each clock timing corresponding to the data signal. The control circuit is connected to the equalizer circuit. The control circuit changes, before the data signal is received, a tap coefficient related to a characteristic of the equalizer circuit in a state in which a second voltage different from the first voltage, instead of the voltage of the data signal, is supplied to the equalizer circuit, to detect an inverted tap coefficient that is the tap coefficient at a boundary where a data value of the output value is inverted. The control circuit sets the inverted tap coefficient to the equalizer circuit at a time of receiving the data signal.

20 Claims, 14 Drawing Sheets

RECEPTION DEVICE AND RECEPTION METHOD

CROSS-REFERENCE TO RELATED APPLICATIONS

This application is based upon and claims the benefit of priority from Japanese Patent Application No. 2022-045660, filed on Mar. 22, 2022; the entire contents of which are incorporated herein by reference.

FIELD

Embodiments described herein relate generally to a reception device and a reception method.

BACKGROUND

In a memory system, a data signal and a strobe signal are transmitted and received between a memory device and a controller. For example, a memory system in which devices are configured by package-on-package (PoP) has a short transmission path between the memory device and the controller and has a low insertion loss and less reflection. However, the memory device with increasingly larger capacity has the longer and more complicated transmission path between the memory device and the controller, making it prone to the insertion loss and the reflection. Thus, it is considered that, in the memory device with increasingly larger capacity, the data signal is received through a decision feedback equalizer (DFE) to reduce influence of the insertion loss, the reflection, and the like.

In a case where the tap coefficient of DFE is achieved by the mutual conductance (gm) of transistor, the mutual conductance largely varies depending on a difference in PVT (Process, Voltage and Temperature). Thus, even if the tap coefficient is set in advance at the time of designing, a characteristic of the tap coefficient varies depending on the difference in PVT. Thus, it has been difficult to receive a data signal with high accuracy when the data signal is received by such a DFE.

DETAILED DESCRIPTION

According to an embodiment, a reception device is configured to receive a data signal representing a data value 0 or 1. The reception device includes: an equalizer circuit configured to output an output value representing a result obtained by comparing a voltage based on the received data signal and a first voltage as a reference, at each clock timing corresponding to the data signal; and a control circuit connected to the equalizer circuit. The control circuit being configured to: change, before the data signal is received, a tap coefficient related to a characteristic of the equalizer circuit in a state in which a second voltage different from the first voltage, instead of the voltage of the data signal, is supplied to the equalizer circuit, to detect an inverted tap coefficient that is the tap coefficient at a boundary where a data value of the output value is inverted; and set, at a time of receiving the data signal, the inverted tap coefficient to the equalizer circuit.

Hereinafter, embodiments will be described in detail with reference to the accompanying drawings. Note that the present invention is not limited by these embodiments.

Figure 1:
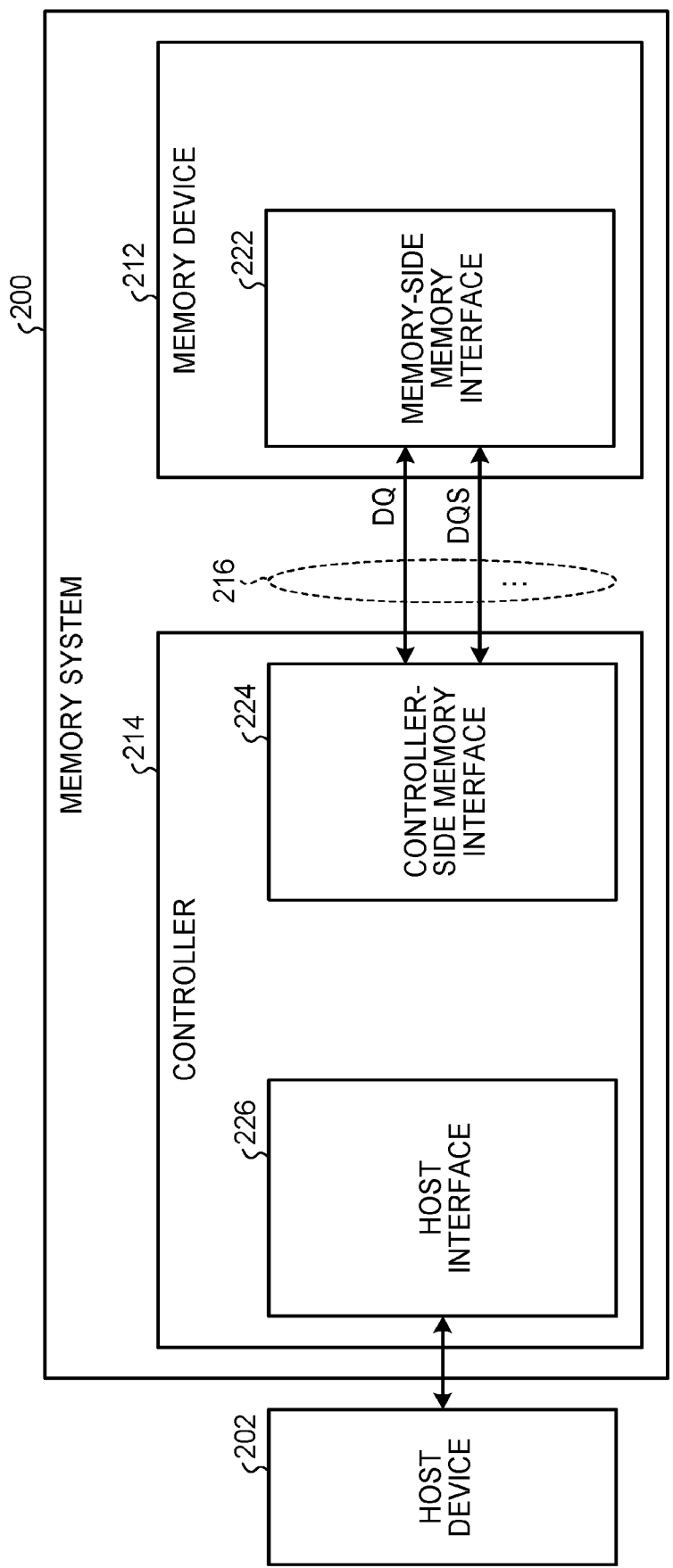
FIG. 1 is a diagram illustrating a configuration of a memory system including a reception device according to an embodiment.

FIG. 1 is a diagram illustrating a configuration of a memory system 200 and a host device 202. The memory system 200 is connected to the host device 202. The memory system 200 functions as a storage device of the host device 202. The host device 202 is a computer or an arithmetic processing circuit including a process and the like.

Examples of the memory system 200 include a solid-state drive (SSD) and a universal flash storage (UFS) device. The memory system 200 includes a memory device 212 and a controller 214. The memory device 212 and the controller 214 are connected via a bus wiring 216.

The memory device 212 is one or more non-volatile semiconductor memories. Examples of the non-volatile semiconductor memory include a NAND type flash memory. Further, the memory device 212 may be one or more volatile semiconductor memories such as a DRAM.

The controller 214 transmits/receives information to/from the host device 202. The controller 214 performs memory access such as writing and reading of data to the memory device 212 in response to a request or the like from the host device 202.

The memory device 212 includes a memory-side memory interface 222. Further, the controller 214 includes a controller-side memory interface 224. The memory-side memory interface 222 includes a transmission circuit and a reception circuit. The controller-side memory interface 224 includes a transmission circuit and a reception circuit.

The memory-side memory interface 222 and the controller-side memory interface 224 performs transmission and reception of a signal between the memory device 212 and the controller 214 via the bus wiring 216. This signal includes a data signal (DQ) and a strobe signal (DQS) representing timing of the data signal (DQ). The data signal (DQ) is a signal in which a data value (0 or 1) is represented by a voltage. The memory-side memory interface 222 and the controller-side memory interface 224 may transmit and receive a plurality of the data signals (DQ) and transmit and receive the data in parallel.

Further, the controller 214 includes a host interface 226. The host interface 226 transmits/receives data to/from the host device 202 via a bus corresponding to a predetermined interface standard.

Figure 2:
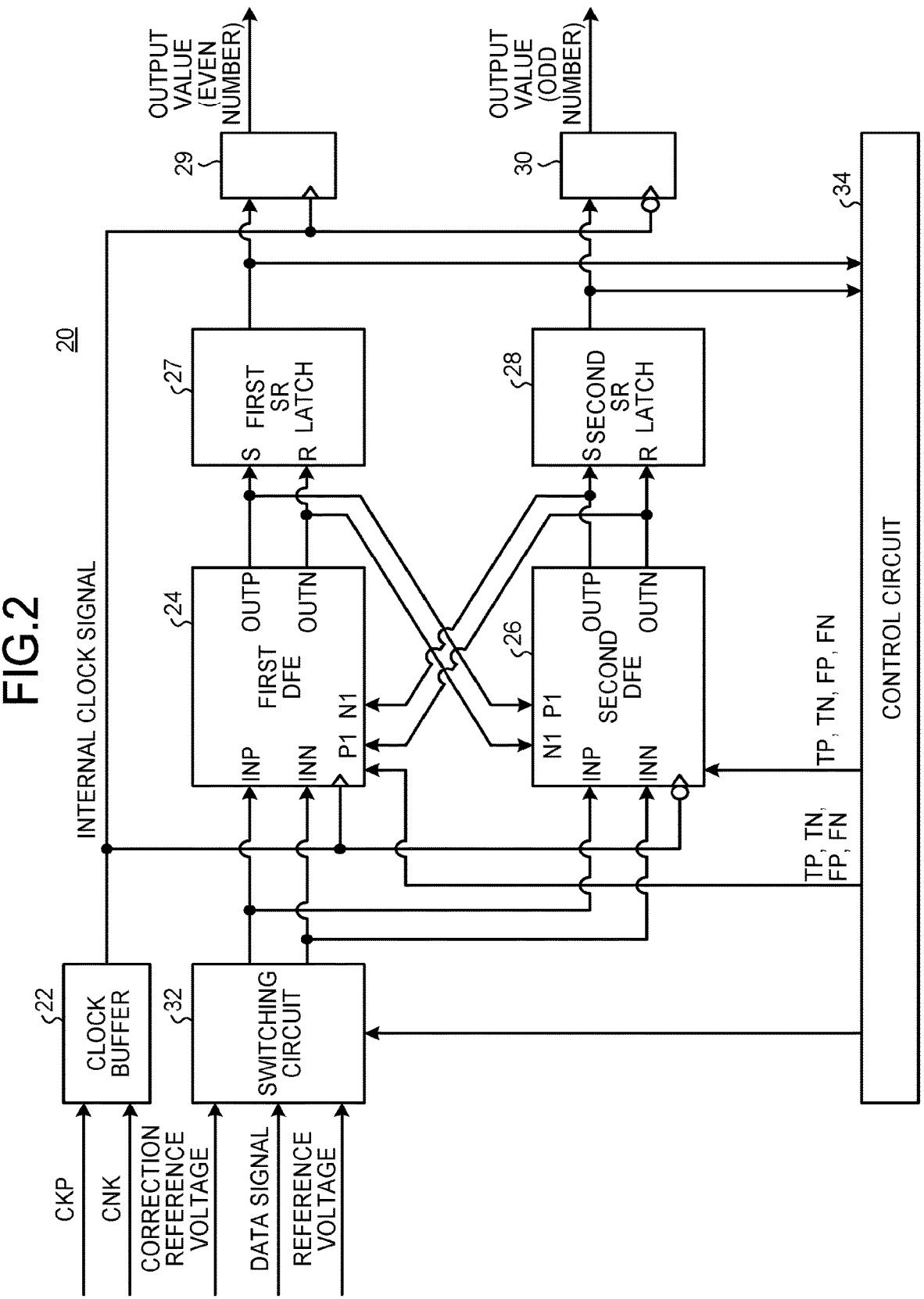
FIG. 2 is a diagram illustrating a configuration of the reception device according to the embodiment.

FIG. 2 is a diagram illustrating a configuration of a reception device 20 according to the embodiment.

The reception device 20 according to the present embodiment is, for example, included as a part of a reception function of the data signal in both or one of the memory-side memory interface 222 and the controller-side memory interface 224 in the memory system 200. Note that the reception device 20 is not limited to the reception of the data signal in the memory system 200 and may be included in other devices as a reception function for receiving a serial data signal representing 0 or 1. For example, the reception device 20 may be included in the host interface 226 or the host device 202.

The reception device 20 according to the present embodiment receives the data signal. The reception device 20 outputs an output value representing a value of the received data signal at each clock timing of the data signal.

The reception device 20 includes a clock buffer 22, a first decision feedback equalizer 24 (first DFE), a second decision feedback equalizer 26 (second DFE), a first SR latch 27, a second SR latch 28, a first flip-flop 29, a second flip-flop 30, a switching circuit 32, and a control circuit 34.

A reference clock (CKP) and an inverted reference clock (CKN) are adjusted in a training period prior to data transmission and reception, so that reception data can be sampled at an appropriate phase. The inverted reference clock (CKN) is a signal whose phase is inverted from that of the reference clock (CKP). The clock buffer 22 is a buffer that compensates for a circuit load of the first decision feedback equalizer 24, the second decision feedback equalizer 26, and the like in the following stage. In the present embodiment, the clock buffer 22 receives the reference clock (CKP) and the inverted reference clock (CKN) and outputs an internal clock signal. The internal clock signal is a signal that has a cycle twice that of the clock signal embedded in the data signal.

Each of the first decision feedback equalizer 24 and the second decision feedback equalizer 26 is a decision-feedback type equalizer circuit. Each of the first decision feedback equalizer 24 and the second decision feedback equalizer 26 outputs an output value representing a value of the data signal at the time of receiving the data signal. In the present embodiment, each of the first decision feedback equalizer 24 and the second decision feedback equalizer 26 outputs a differential output signal representing the output value.

At the time of receiving the data signal, the first decision feedback equalizer 24 receives the internal clock signal and acquires a value from the data signal in synchronization with the internal clock signal to generate the output value. The internal clock signal is a signal that has a cycle twice the minimum cycle of the data signal, thus the first decision feedback equalizer 24 outputs the output value at each even-numbered clock timing of the data signal.

At the time of receiving the data signal, the second decision feedback equalizer 26 receives an inverted signal of the internal clock signal and acquires a value from the data signal in synchronization with the inverted signal of the internal clock signal to generate the output value. The internal clock signal is a signal that has a cycle twice the minimum cycle of the data signal, thus the second decision feedback equalizer 26 outputs the output value at each odd-numbered clock timing of the data signal.

At the time of receiving the data signal, each of the first decision feedback equalizer 24 and the second decision feedback equalizer 26 acquires the data signal, a reference voltage, and a past output value. The past output value is an output value outputted at the past clock timing. The past clock timing is, for example, the timing one sample before. Then, each of the first decision feedback equalizer 24 and the second decision feedback equalizer 26 outputs the output value representing a result obtained by comparing the reference voltage and a voltage obtained by adding or subtracting a correction voltage to or from the voltage of the data signal. The correction voltage is a voltage obtained by multiplying the past output value by a tap coefficient. The tap coefficient is a parameter related to a characteristic of the first decision feedback equalizer 24 and the second decision feedback equalizer 26.

In the present embodiment, the first decision feedback equalizer 24 acquires the output value outputted by the second decision feedback equalizer 26 with the sample immediately before as the past output value. Further, in the present embodiment, the second decision feedback equalizer 26 acquires the output value outputted by the first decision feedback equalizer 24 with the sample immediately before as the past output value.

Further, each of the first decision feedback equalizer 24 and the second decision feedback equalizer 26 executes offset adjustment and tap coefficient correction before receiving the data signal. That is, the offset adjustment and the tap coefficient correction are executed before the data signal is received.

Each of the first decision feedback equalizer 24 and the second decision feedback equalizer 26 is supplied with the reference voltage instead of the data signal at the time of the offset adjustment. At the time of the offset adjustment, an inverted offset value that causes a boundary state where the output value is inverted from 0 to 1 or from 1 to 0 is detected. Then, the inverted offset value is set as the offset value to each of the first decision feedback equalizer 24 and the second decision feedback equalizer 26 at the time of receiving the data signal.

Further, each of the first decision feedback equalizer 24 and the second decision feedback equalizer 26 is supplied with a correction reference voltage that is set in advance instead of the data signal at the time of the tap coefficient adjustment. At the time of the tap coefficient adjustment, an inverted tap coefficient that causes a boundary state where the output value is inverted from 0 to 1 or from 1 to 0 is detected. Then, the inverted tap coefficient is set as the tap coefficient to each of the first decision feedback equalizer 24 and the second decision feedback equalizer 26 at the time of receiving the data signal.

The correction reference voltage described herein is a voltage that removes a post-cursor in a single bit response. The single bit response is determined by a transmission path in which the data signal is transmitted and a voltage and a frequency of the data signal. Thus, the correction reference voltage can be determined by performing a measurement beforehand, a simulation, or the like, once the system implemented in the reception device 20 is determined. Thus, a system designer or the like can set the correction reference voltage to the reception device 20 in advance before the data signal is received.

For example, in an example in FIG. 2, each of the first decision feedback equalizer 24 and the second decision feedback equalizer 26 includes an INP terminal, an INN terminal, a P1 terminal, and an N1 terminal as input terminals. The data signal is supplied through the INP terminal at the time of receiving the data signal. The reference voltage is supplied through the INN terminal at the time of receiving the data signal. A positive side value of the output value of the sample immediately before is inputted through the P1 terminal. A negative side value of the output value of the sample immediately before is inputted through the N1 terminal. The output value of the sample immediately before described herein is the past output value.

Further, for example, in the example in FIG. 2, each of the first decision feedback equalizer 24 and the second decision feedback equalizer 26 includes an OUTP terminal and an OUTN terminal as output terminals. A positive side value of the differential output value is outputted through the OUTP terminal. A negative side value of the differential output value is outputted through the OUTN terminal.

The first SR latch 27 receives the positive side value of the differential output value outputted from the OUTP terminal of the first decision feedback equalizer 24 through a set terminal. The first SR latch 27 receives the negative side value of the differential output value outputted from the OUTN terminal of the first decision feedback equalizer 24 through a reset terminal. The first SR latch 27 sets the output value as 1 when a value of the set terminal becomes 1 during a period in which a value of the reset terminal is 0 and keeps the output value at 1 even if the set terminal subsequently becomes 0. Further, the first SR latch 27 sets the output value as 0 when the value of the reset terminal becomes 1 during a period in which the value of the set terminal is 0 and keeps the output value at 0 even if the reset terminal subsequently becomes 0.

The second SR latch 28 receives the positive side value of the differential output value outputted from the OUTP terminal of the second decision feedback equalizer 26 through a set terminal. The second SR latch 28 receives the negative side value of the differential output value outputted from the OUTN terminal of the second decision feedback equalizer 26 through a reset terminal. The second SR latch 28 operates similarly to the first SR latch 27.

The first flip-flop 29 acquires and keeps the output value of the first SR latch 27 in synchronization with the timing of the internal clock signal. Then, the first flip-flop 29 outputs the kept value. Thus, the first flip-flop 29 can output the output value at the even-numbered clock timing of the data signal.

The second flip-flop 30 acquires and keeps the output value of the second SR latch 28 in synchronization with the timing of the inverted signal of the internal clock signal. Then, the second flip-flop 30 outputs the kept value. Thus, the second flip-flop 30 can output the output value at the odd-numbered clock timing of the data signal.

The switching circuit 32 supplies the data signal and the reference voltage to the first decision feedback equalizer 24 and the second decision feedback equalizer 26 at the time of receiving the data signal. In the example in FIG. 2, the switching circuit 32 supplies the data signal to each of the INP terminals and supplies the reference voltage to each of the INN terminals at the time of receiving the data signal.

Further, the switching circuit 32 supplies the reference voltage instead of the data signal to the first decision feedback equalizer 24 and the second decision feedback equalizer 26 at the time of the offset adjustment. In the example in FIG. 2, the switching circuit 32 supplies the reference voltage to both the INP terminal and the INN terminal in each equalizer at the time of the offset adjustment.

Further, the switching circuit 32 supplies the correction reference voltage instead of the data signal to the first decision feedback equalizer 24 and the second decision feedback equalizer 26 at the time of the tap coefficient adjustment. In the example in FIG. 2, the switching circuit 32 supplies the correction reference voltage to each of the INP terminals and supplies the reference voltage to each of the INN terminals at the time of the tap coefficient adjustment.

The control circuit 34 performs switching control of the switching circuit 32. Further, the control circuit 34 sets the offset value and the tap coefficient to the first decision feedback equalizer 24 and the second decision feedback equalizer 26 at the time of receiving the data.

Further, the control circuit 34 executes control for the offset adjustment and the tap coefficient adjustment separately to each of the first decision feedback equalizer 24 and the second decision feedback equalizer 26 before the data signal is received.

The control circuit 34 controls the switching circuit 32 to supply the reference voltage instead of the voltage of the data signal to the first decision feedback equalizer 24 and the second decision feedback equalizer 26 at the time of the offset adjustment. The control circuit 34 changes the offset value in each of the first decision feedback equalizer 24 and the second decision feedback equalizer 26 at the time of the offset adjustment. In this manner, the control circuit 34 detects the inverted offset value which is the offset value at the boundary where the output value is inverted. Then, the control circuit 34 set the detected inverted offset value as the offset value to each of the first decision feedback equalizer 24 and the second decision feedback equalizer 26 at the time of receiving the data signal.

More specifically, the control circuit 34 detects a first inverted offset value by changing the offset value of the first decision feedback equalizer 24 at the time of the offset adjustment. The control circuit 34 sets the first inverted offset value as the offset value of the first decision feedback equalizer 24 at the time of receiving the data signal. Further, the control circuit 34 detects a second inverted offset value by changing the offset value of the second decision feedback equalizer 26 at the time of the offset adjustment. The control circuit 34 sets the second inverted offset value as the offset value of the second decision feedback equalizer 26 at the time of receiving the data signal. The control circuit 34 detects the first inverted offset value on the basis of the output of the first SR latch 27. The control circuit 34 detects the second inverted offset value on the basis of the output of the second SR latch 28.

The control circuit 34 controls the switching circuit 32 to supply the correction reference voltage instead of the voltage of the data signal to the first decision feedback equalizer 24 and the second decision feedback equalizer 26 at the time of the tap coefficient adjustment. The control circuit 34 changes the tap coefficient in each of the first decision feedback equalizer 24 and the second decision feedback equalizer 26 at the time of the tap coefficient adjustment. In this manner, the control circuit 34 detects the inverted tap coefficient which is the tap coefficient at the boundary where the output value is inverted. Then, the control circuit 34 set the detected inverted tap coefficient as the tap coefficient to each of the first decision feedback equalizer 24 and the second decision feedback equalizer 26 at the time of receiving the data signal.

More specifically, the control circuit 34 detects a first inverted tap coefficient by changing the tap coefficient of the first decision feedback equalizer 24 at the time of the tap coefficient adjustment. The control circuit 34 sets the first inverted tap coefficient as the tap coefficient of the first decision feedback equalizer 24 at the time of receiving the data signal. Further, the control circuit 34 detects a second inverted tap coefficient by changing the tap coefficient of the second decision feedback equalizer 26 at the time of the tap coefficient adjustment. The control circuit 34 sets the second inverted tap coefficient as the tap coefficient of the second decision feedback equalizer 26 at the time of receiving the data signal. The control circuit 34 detects the first inverted tap coefficient on the basis of the output of the first SR latch 27. The control circuit 34 detects the second inverted tap coefficient on the basis of the output of the second SR latch 28.

In the example in FIG. 2, the control circuit 34 supplies signals TP, TN, FP, and FN to each of the first decision feedback equalizer 24 and the second decision feedback equalizer 26. The signal TP represents a signal for setting the tap coefficient having a positive value. The signal TN represents a signal for setting the tap coefficient having a negative value. The signal FP represents a signal for setting the offset value having a positive value. The signal FN represents a signal for setting the offset value having a negative value.

Figure 3:
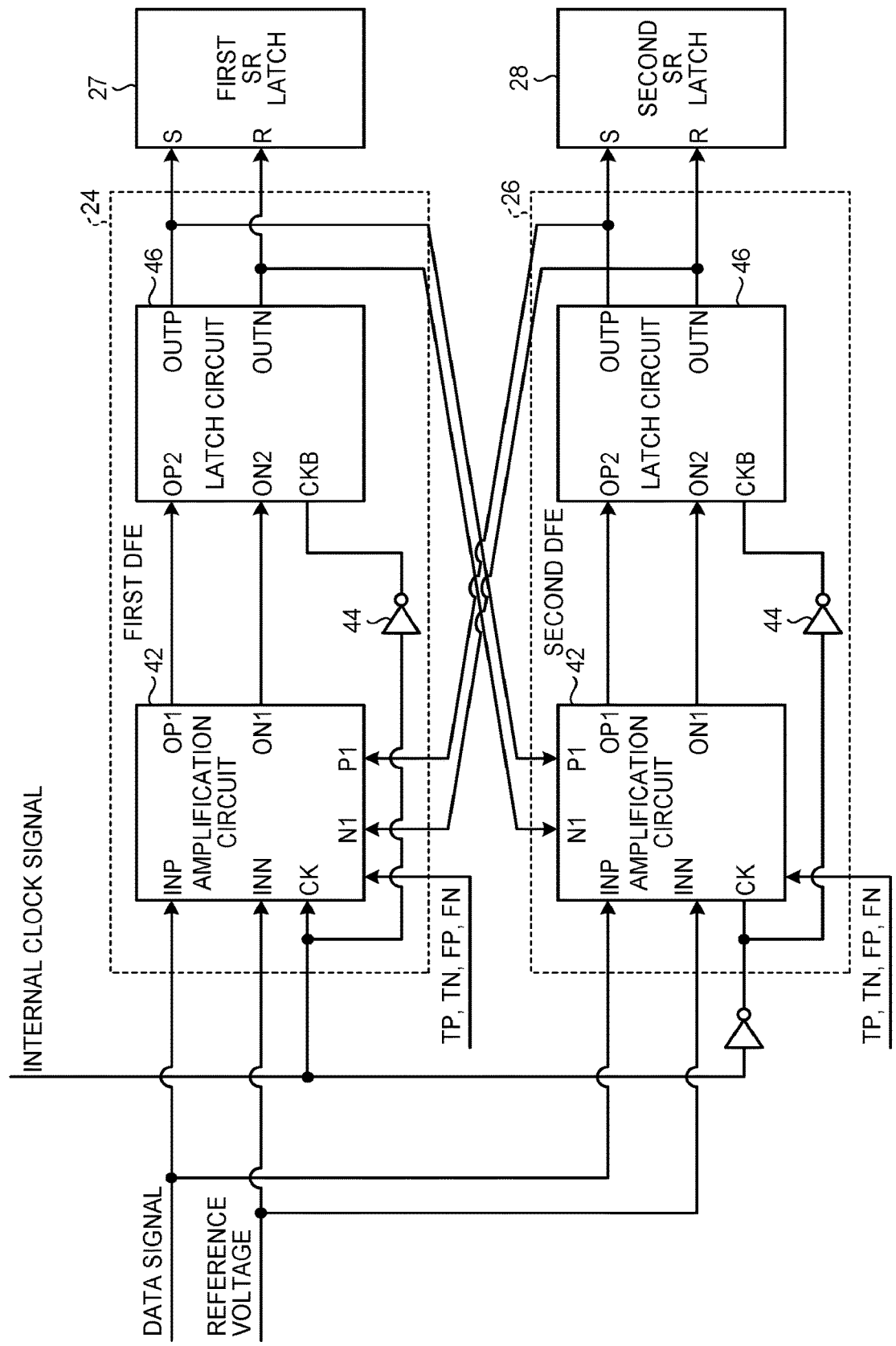
FIG. 3 is a diagram illustrating a configuration of a first decision feedback equalizer and a second decision feedback equalizer.

FIG. 3 is a diagram illustrating a configuration of the first decision feedback equalizer 24 and the second decision feedback equalizer 26.

Each of the first decision feedback equalizer 24 and the second decision feedback equalizer 26 has the same configuration and includes an amplification circuit 42, a clock inverting circuit 44, and a latch circuit 46.

Each of the first decision feedback equalizer 24 and the second decision feedback equalizer 26 repeats a reset period and a comparison period in synchronization with the given clock signal. The first decision feedback equalizer 24 is given the internal clock signal as the clock signal and operates in a period in which a value of the internal clock signal is 1 (an H level) as the reset period and in a period in which the value of the internal clock signal is 0 (an L level) as the comparison period. The second decision feedback equalizer 26 is given the inverted signal of the internal clock signal as the clock signal and operates in a period in which a value of the inverted signal of the internal clock signal is 1 (an H level) as the reset period and in a period in which the value of the inverted signal of the internal clock signal is 0 (an L level) as the comparison period.

The amplification circuit 42 charges an electric charge to stray capacitance of an OP1 terminal and an ON1 terminal in the reset period. In the comparison period, the amplification circuit 42 amplifies a differential voltage between a voltage obtained by adding or subtracting the correction voltage to or from the voltage of the data signal and the reference voltage, and outputs the resulting amplified signal to the latch circuit 46.

In an example in FIG. 3, in the amplification circuit 42, the internal clock signal or the inverted signal thereof is inputted through a CK terminal, the data signal is inputted through the INP terminal, and the reference voltage is inputted through the INN terminal. In the amplification circuit 42, the positive side output value of the sample immediately before is inputted through the P1 terminal and the negative side output value of the sample immediately before is inputted through the N1 terminal. The positive side output value inputted through the P1 terminal is the past output value and the negative side output value inputted through the N1 terminal is a value in which the past output value is inverted. Further, in the example in FIG. 3, the amplification circuit 42 outputs the amplified signal which is the amplified voltage difference from the OP1 terminal and the ON1 terminal.

Further, the amplification circuit 42 acquires the signals TP, TN, FP, and FN used for setting the tap coefficient and the offset value. Then, the amplification circuit 42 sets the tap coefficient and the offset value in accordance with the acquired signals TP, TN, FP, and FN.

The clock inverting circuit 44 receives the clock signal and the inverted signal thereof and outputs the inverted clock signal obtained by inverting the received signal.

The latch circuit 46 keeps and, at the same time, outputs a value of the amplified signal outputted from the amplification circuit 42 in the preceding stage in the comparison period.

In the example in FIG. 3, in the latch circuit 46, the inverted clock signal is inputted through a CKB terminal, a positive side signal of the amplified signal is inputted through an OP2 terminal, and a negative side signal of the amplified signal is inputted through an ON2 terminal. Further, in the example in FIG. 3, in the latch circuit 46, a positive side value of the differential output value is outputted from the OUTP terminal and a negative side value of the differential output value is outputted from the OUTN terminal.

In the first SR latch 27, the positive side value of the differential output value is inputted through the set terminal and the negative side value of the differential output value is inputted through the reset terminal from the latch circuit 46 of the first decision feedback equalizer 24. In the second SR latch 28, the positive side value of the differential output value is inputted through the set terminal and the negative side value of the differential output value is inputted through the reset terminal from the latch circuit 46 of the second decision feedback equalizer 26. The first SR latch 27 and the second SR latch 28 keep the signal to be outputted in the reset period and let the signal inputted through the set terminal pass in the comparison period.

Figure 4:
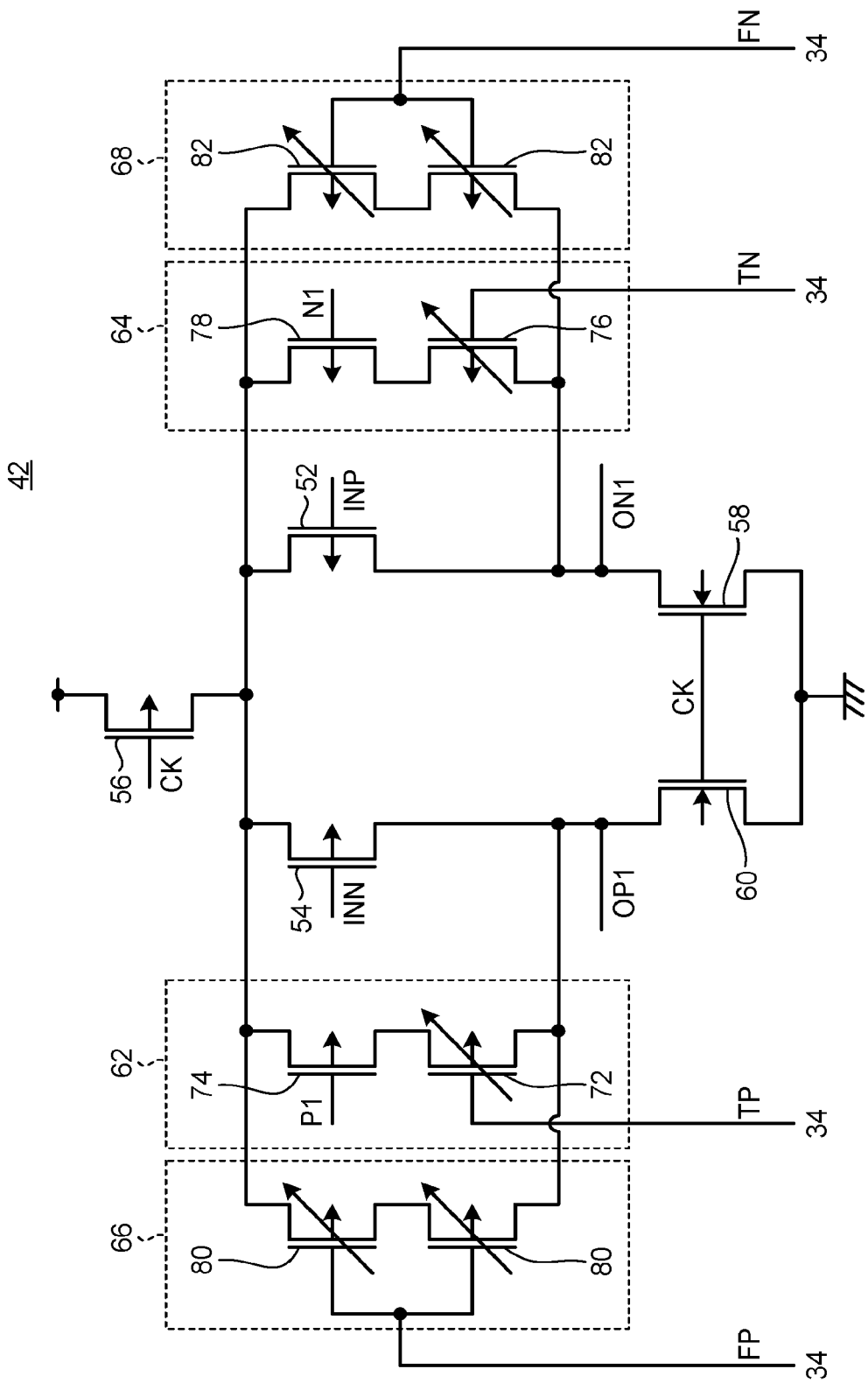
FIG. 4 is a diagram illustrating a circuit configuration of an amplification circuit.

FIG. 4 is a diagram illustrating a circuit configuration of an amplification circuit 42. As an example, the amplification circuit 42 includes a first FET 52, a second FET 54, a first switch 56, a second switch 58, a third switch 60, a positive-side tap coefficient circuit 62, a negative-side tap coefficient circuit 64, a positive side offset circuit 66, and a negative side offset circuit 68.

In the first FET 52, a gate is connected to the INP terminal and applied with the voltage of the data signal. The first FET 52 is, for example, a pMOSFET.

In the second FET 54, a gate is connected to the INN terminal and applied with the reference voltage. The second FET 54 is, for example, a pMOSFET.

The first switch 56 connects a source of the first FET 52 and a source of the second FET 54 to a power potential in the comparison period and disconnects the source of the first FET 52 and the source of the second FET 54 from the power potential in the reset period. The power potential is a voltage potential which is supplied to the amplification circuit 42 and serves as a power source for the amplification circuit 42 to be operated. The first switch 56 is, for example, a pMOSFET. In the first switch 56, a gate is connected to the CK terminal and applied with a voltage of the clock signal.

The second switch 58 connects a drain of the first FET 52 to a ground potential in the reset period and disconnects the drain of the first FET 52 from the ground potential in the comparison period. The ground potential is a voltage potential which is supplied to the amplification circuit 42 and serves as a reference for the amplification circuit 42 to be operated. The second switch 58 is, for example, an nMOSFET. In the second switch 58, a gate is connected to the CK terminal and applied with a voltage of the clock signal.

The third switch 60 connects a drain of the second FET 54 to a ground potential in the reset period and disconnects the drain of the second FET 54 from the ground potential in the comparison period. The third switch 60 is, for example, an nMOSFET. In the third switch 60, a gate is connected to the CK terminal and applied with a voltage of the clock signal.

The positive-side tap coefficient circuit 62 is connected in parallel with the drain and the source of the second FET 54. When the past output value is 1 (in the present embodiment, when the positive side output value of the sample immediately before received from the P1 terminal is 1), the positive-side tap coefficient circuit 62 connects the drain and the source of the second FET 54 with a resistance value in accordance with the set tap coefficient. The positive-side tap coefficient circuit 62 causes disconnection between the drain and the source of the second FET 54 when the past output value is 0.

The positive-side tap coefficient circuit 62 includes, for example, a third FET 72 and a fourth switch 74. The drain and the source of the third FET 72 and the fourth switch 74 are connected in series. The third FET 72 is, for example, a pMOSFET. The fourth switch 74 is, for example, a pMOSFET. A gate of the fourth switch 74 is connected to the P1 terminal, allowing the positive side output value of the sample immediately before to be inputted.

In the third FET 72, the number of FETs in accordance with the positive-side tap coefficient is set to the gate by the signal TP from the control circuit 34. The third FET 72 includes a plurality of FET elements. In the third FET 72, a resistance value between the drain and the source is changed by selecting the number of the FET elements turned on among the plurality of the FET elements in accordance with the number of FETs selected by the control circuit 34. The fourth switch 74 makes a short circuit when the past output value is 1 (in the present embodiment, when the positive side output value of the sample immediately before received from the P1 terminal is 1) and causes disconnection when the past output value is 0.

As illustrated in FIG. 4, the drain of the third FET 72 is connected to the drain of the second FET 54. Further, the fourth switch 74 makes a short circuit or causes disconnection between the source of the third FET 72 and the source of the second FET 54.

The negative-side tap coefficient circuit 64 is connected in parallel with the drain and the source of the first FET 52. When the past output value is 0 (in the present embodiment, when the negative side output value of the sample immediately before received from the N1 terminal is 1), the negative-side tap coefficient circuit 64 connects the drain and the source of the first FET 52 with a resistance value in accordance with the set tap coefficient. The negative-side tap coefficient circuit 64 causes disconnection between the drain and the source of the first FET 52 when the past output value is 1.

The negative-side tap coefficient circuit 64 includes, for example, a fourth FET 76 and a fifth switch 78. The drain and the source of the fourth FET 76 and the fifth switch 78 are connected in series. The fourth FET 76 is, for example, a pMOSFET. The fifth switch 78 is, for example, a pMOSFET. A gate of the fifth switch 78 is connected to the N1 terminal, allowing the negative side past output value of the sample immediately before to be inputted.

In the fourth FET 76, the number of FETs in accordance with the negative-side tap coefficient is set to the gate by the signal TN from the control circuit 34. The fourth FET 76 includes a plurality of FET elements. In the fourth FET 76, a resistance value between the drain and the source is changed by selecting the number of the FET elements turned on among the plurality of the FET elements in accordance with the number of FETs selected by the control circuit 34. The fifth switch 78 makes a short circuit when the past output value is 0 (in the present embodiment, when the negative side output value of the sample immediately before received from the N1 terminal is 1) and causes disconnection when the past output value is 1.

As illustrated in FIG. 4, the drain of the fourth FET 76 is connected to the drain of the first FET 52. Further, the fifth switch 78 makes a short circuit or causes disconnection between the source of the fourth FET 76 and the source of the first FET 52.

The positive side offset circuit 66 is connected in parallel with the drain and the source of the second FET 54. The positive side offset circuit 66 connects the drain and the source of the second FET 54 with a resistance value in accordance with the set offset value.

For example, the positive side offset circuit 66 includes a plurality of fifth FETs 80 having each of their sources and drains being connected in series. The plurality of the fifth FETs 80 connected in series are connected in parallel with the drain and the source of the second FET 54. Each of the plurality of the fifth FETs 80 is, for example, a pMOSFET. In the plurality of the fifth FETs 80, the number of FETs in accordance with the positive side offset value is set to each gate by the signal FP from the control circuit 34. Each of the plurality of the fifth FETs 80 includes a plurality of the FET elements. In each of the plurality of the fifth FETs 80, a resistance value between the drain and the source is changed by selecting the number of the FET elements turned on among the plurality of the FET elements in accordance with the number of FETs selected by the control circuit 34.

The negative side offset circuit 68 is connected in parallel with the drain and the source of the first FET 52. The negative side offset circuit 68 connects the drain and the source of the first FET 52 with a resistance value in accordance with the set offset value.

For example, the negative side offset circuit 68 includes a plurality of sixth FETs 82 having each of their sources and drains being connected in series. The plurality of the sixth FETs 82 connected in series are connected in parallel with the drain and the source of the first FET 52. Each of the plurality of the sixth FETs 82 is, for example, a pMOSFET. In the plurality of the sixth FETs 82, the number of FETs in accordance with the negative side offset value is set to each gate by the signal FN from the control circuit 34. Each of the plurality of the sixth FETs 82 includes a plurality of the FET elements. In each of the plurality of the sixth FETs 82, a resistance value between the drain and the source is changed by selecting the number of the FET elements turned on among the plurality of the FET elements in accordance with the number of FETs selected by the control circuit 34.

The drain of the first FET 52 is connected to the ON1 terminal and the drain of the second FET 54 is connected to the OP1 terminal. Then, the amplification circuit 42 having such a configuration outputs a differential amplified signal from the OP1 terminal and the ON1 terminal.

The amplification circuit 42 having the above configuration includes the positive-side tap coefficient circuit 62 and the negative-side tap coefficient circuit 64, thus the amplification circuit 42 can output the differential amplified signal representing a result obtained by comparing the reference voltage and a voltage obtained by adding or subtracting the correction voltage (a voltage obtained by multiplying the past output value by the tap coefficient) to or from the voltage of the data signal. Further, such an amplification circuit 42 includes the positive side offset circuit 66 and the negative side offset circuit 68, thus the amplification circuit 42 can also correct the offset of the voltage of the data signal.

Figure 5:
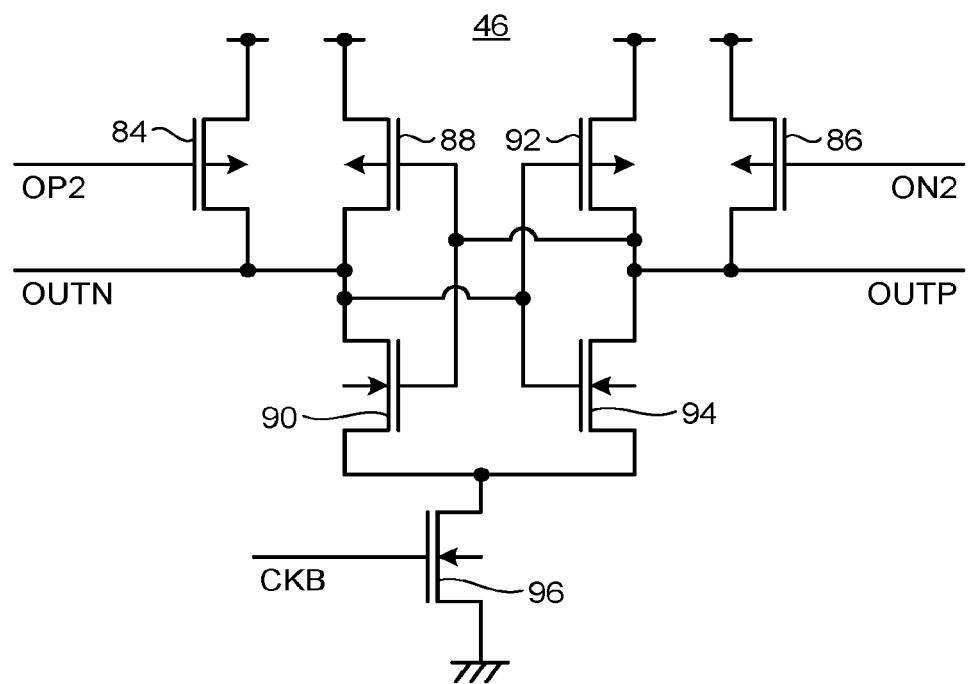
FIG. 5 is a diagram illustrating a circuit configuration of a latch circuit.

FIG. 5 is a diagram illustrating a circuit configuration of a latch circuit 46.

The latch circuit 46 includes a seventh FET 84, an eighth FET 86, a ninth FET 88, a tenth FET 90, an eleventh FET 92, a twelfth FET 94, and a sixth switch 96.

In the seventh FET 84, a gate is connected to the OP2 terminal and applied with a voltage of the positive side signal of the differential amplified signal outputted from the amplification circuit 42. In the seventh FET 84, the source is connected to the power potential and the drain is connected to the OUTN terminal. The seventh FET 84 is, for example, a pMOSFET. The power potential described herein is a voltage potential which is supplied to the latch circuit 46 and serves as a power source for the latch circuit 46 to be operated. The power potential of the latch circuit 46 may be the same as or different from the power potential of the amplification circuit 42.

In the eighth FET 86, a gate is connected to the ON2 terminal and applied with a voltage of the negative side signal of the differential amplified signal outputted from the amplification circuit 42. In the eighth FET 86, the source is connected to the power potential and the drain is connected to the OUTP terminal. The eighth FET 86 is, for example, a pMOSFET.

In the ninth FET 88, the gate is connected to the OUTP terminal. In the ninth FET 88, the source is connected to the power potential and the drain is connected to the OUTN terminal. The ninth FET 88 is, for example, a pMOSFET.

In the tenth FET 90, the gate is connected to the OUTP terminal. In the tenth FET 90, the source is connected to the ground potential via the sixth switch 96 and the drain is connected to the OUTN terminal. The tenth FET 90 is, for example, an nMOSFET. The ground potential described herein is a voltage potential which is supplied to the latch circuit 46 and serves as a reference for the latch circuit 46 to be operated. The ground potential of the latch circuit 46 is the same as the ground potential of the amplification circuit 42.

In the eleventh FET 92, the gate is connected to the OUTN terminal. In the eleventh FET 92, the source is connected to the power potential and the drain is connected to the OUTP terminal. The eleventh FET 92 is, for example, a pMOSFET.

In the twelfth FET 94, the gate is connected to the OUTN terminal. In the twelfth FET 94, the source is connected to the ground potential via the sixth switch 96 and the drain is connected to the OUTP terminal. The twelfth FET 94 is, for example, an nMOSFET.

The sixth switch 96 disconnects the source of the tenth FET 90 and the source of the twelfth FET 94 from the ground potential in the reset period and connects the source of the tenth FET 90 and the source of the twelfth FET 94 to the ground potential in the comparison period. The sixth switch 96 is, for example, an nMOSFET. In the sixth switch 96, a gate is connected to the CKB terminal and applied with a voltage of the inverted signal of the clock signal.

Such a latch circuit 46 outputs the differential output value from the OUTP terminal and the OUTN terminal. The latch circuit 46 having the above configuration sets an output of a cross-coupled inverter at the same potential (as the power source voltage) in the reset period. The cross-coupled inverter is constituted by the ninth FET 88, the tenth FET 90, the eleventh FET 92, and the twelfth FET 94. Then, the latch circuit 46 keeps and outputs a value of the amplified signal outputted from the amplification circuit 42 in the comparison period.

Figure 6:
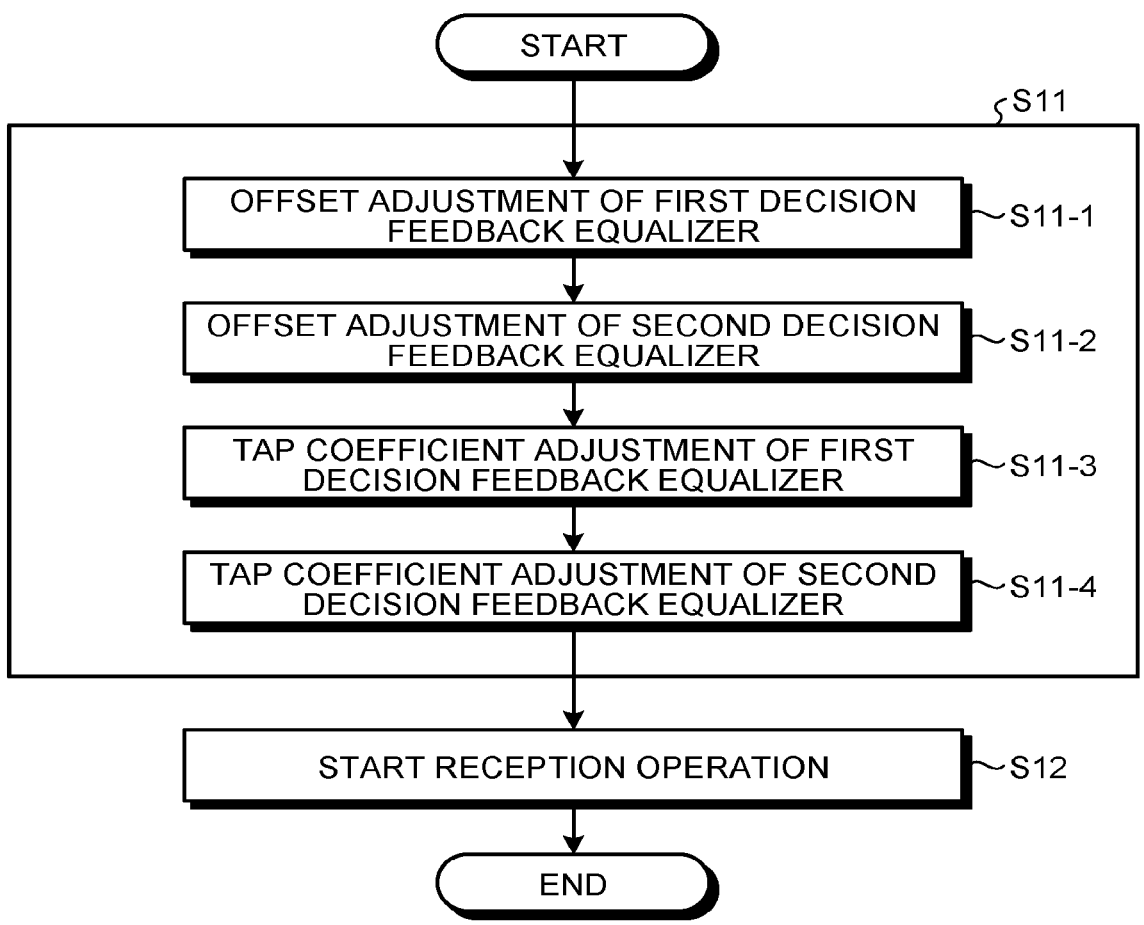
FIG. 6 is a flowchart illustrating a process of processing by a control circuit.
Figure 7:
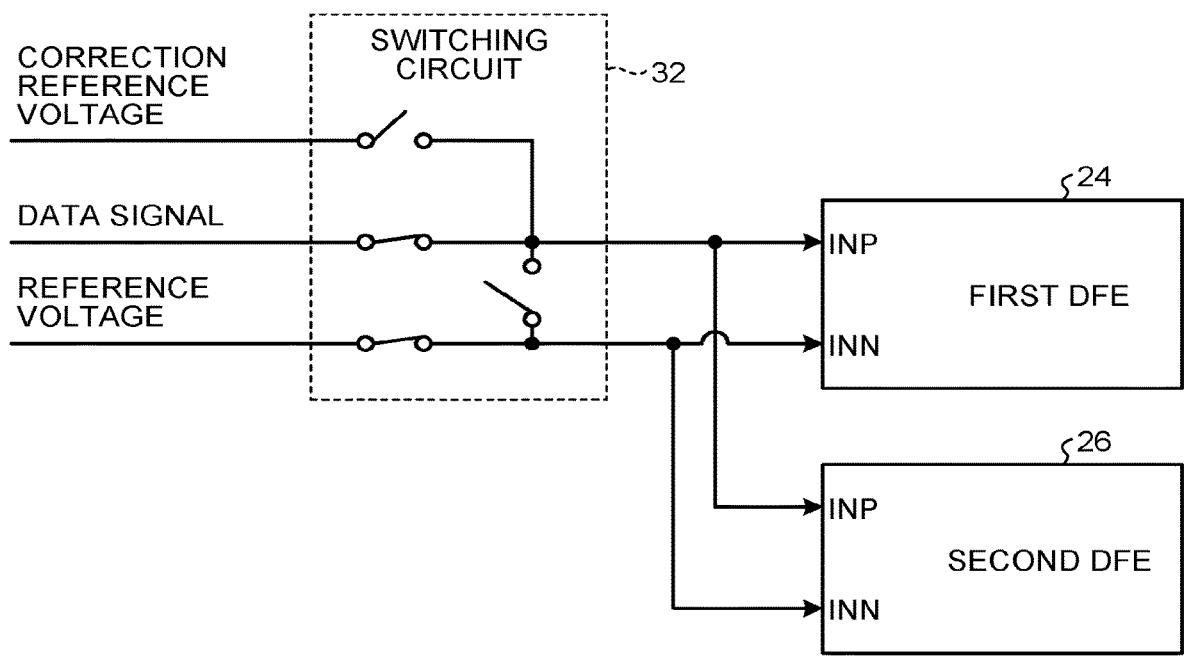
FIG. 7 is a diagram illustrating a connection state caused by a switching circuit at the time of receiving a data signal.

FIG. 6 is a flowchart illustrating a process of processing by the control circuit 34. FIG. 7 is a diagram illustrating a connection state caused by the switching circuit 32 at the time of receiving a data signal.

The control circuit 34 executes adjustment processing of the offset value and the tap coefficient before the data signal is received (S11).

In the adjustment processing (S11), first, in S11-1, the control circuit 34 performs the offset adjustment of the first decision feedback equalizer 24. Next, in S11-2, the control circuit 34 performs the offset adjustment of the second decision feedback equalizer 26. Next, in S11-3, the control circuit 34 performs the tap coefficient adjustment of the first decision feedback equalizer 24. Next, in S11-4, the control circuit 34 performs the tap coefficient adjustment of the second decision feedback equalizer 26.

Then, after completing the adjustment processing (S11), the control circuit 34 starts a reception operation of the data signal (S12). As illustrated in FIG. 7, at the time of receiving the data signal, the control circuit 34 controls the switching circuit 32, so that the data signal is inputted into the INP terminals of the first decision feedback equalizer 24 and the second decision feedback equalizer 26 and the reference voltage is inputted into the INN terminals of the first decision feedback equalizer 24 and the second decision feedback equalizer 26.

Figure 8:
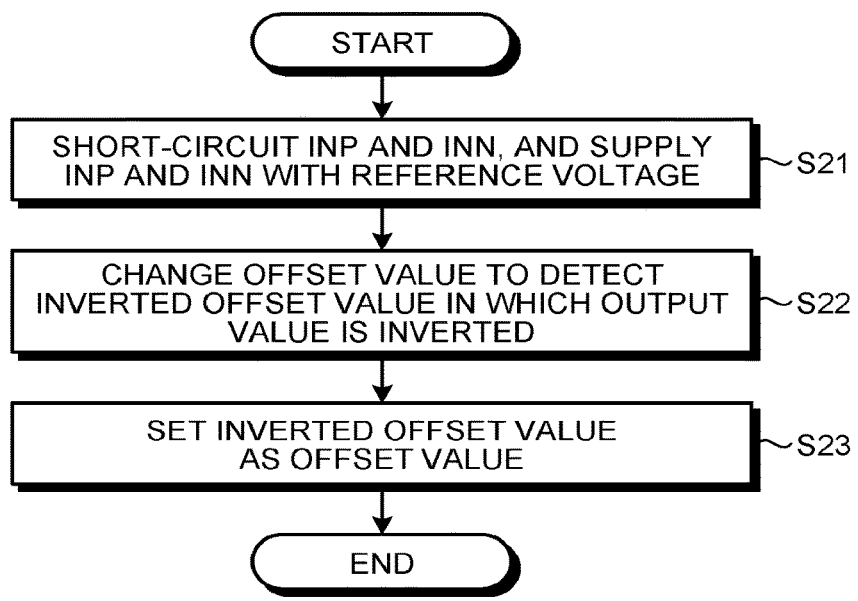
FIG. 8 is a flowchart illustrating a process of processing at the time of offset adjustment.
Figure 9:
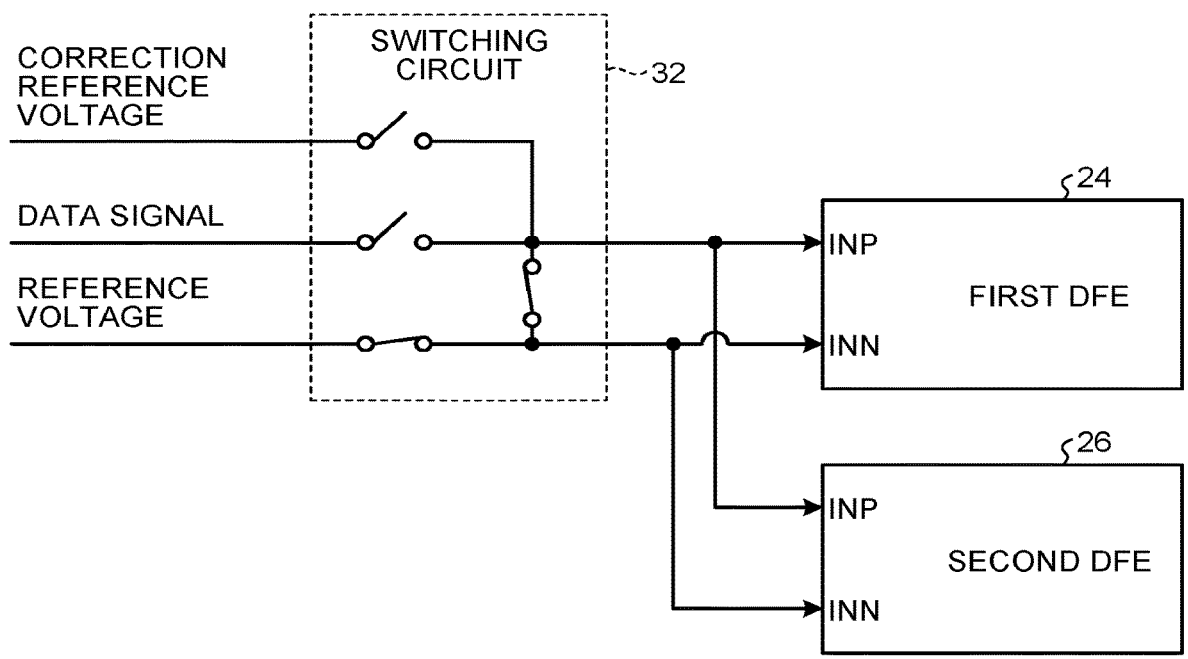
FIG. 9 is a diagram illustrating a connection state caused by the switching circuit at the time of the offset adjustment.

FIG. 8 is a flowchart illustrating a process of processing at the time of offset adjustment. FIG. 9 is a diagram illustrating a connection state caused by the switching circuit 32 at the time of the offset adjustment. At the time of the offset adjustment, the control circuit 34 executes the processing in accordance with the process illustrated in FIG. 8 in regard to the first decision feedback equalizer 24.

First, as illustrated in FIG. 9, in S21, the control circuit 34 controls the switching circuit 32, so that the INP terminal and the INN terminal of the first decision feedback equalizer 24 are short-circuited and thereby supplied with the reference voltage. In this manner, the control circuit 34 can cause a state in which the reference voltage instead of the voltage of the data signal is supplied to the first decision feedback equalizer 24.

Next, in S22, the control circuit 34 detects a first inverted offset value which is the offset value at the boundary where the output value is inverted by changing the offset value in regard to the first decision feedback equalizer 24. For example, the control circuit 34 changes the offset value by changing the number of FETs for setting the offset value.

Next, in S23, the control circuit 34 sets the first inverted offset value detected in S22 as the offset value to the first decision feedback equalizer 24. For example, the control circuit 34 sets the number of FETs at the boundary where the output value is inverted, detected in S22, to the first decision feedback equalizer 24. Then, the control circuit 34 ends the offset adjustment processing by ending the processing in S23.

Note that the control circuit 34 detect a second inverted offset value and sets the second inverted offset value as the offset value to the second decision feedback equalizer 26 in the same manner.

Figure 10:
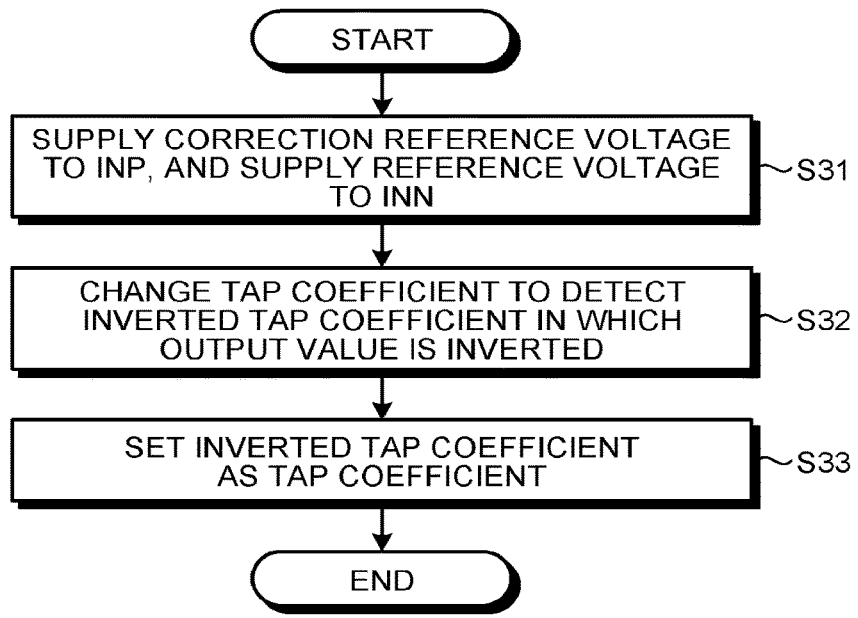
FIG. 10 is a flowchart illustrating a process of processing at the time of tap coefficient adjustment.
Figure 11:
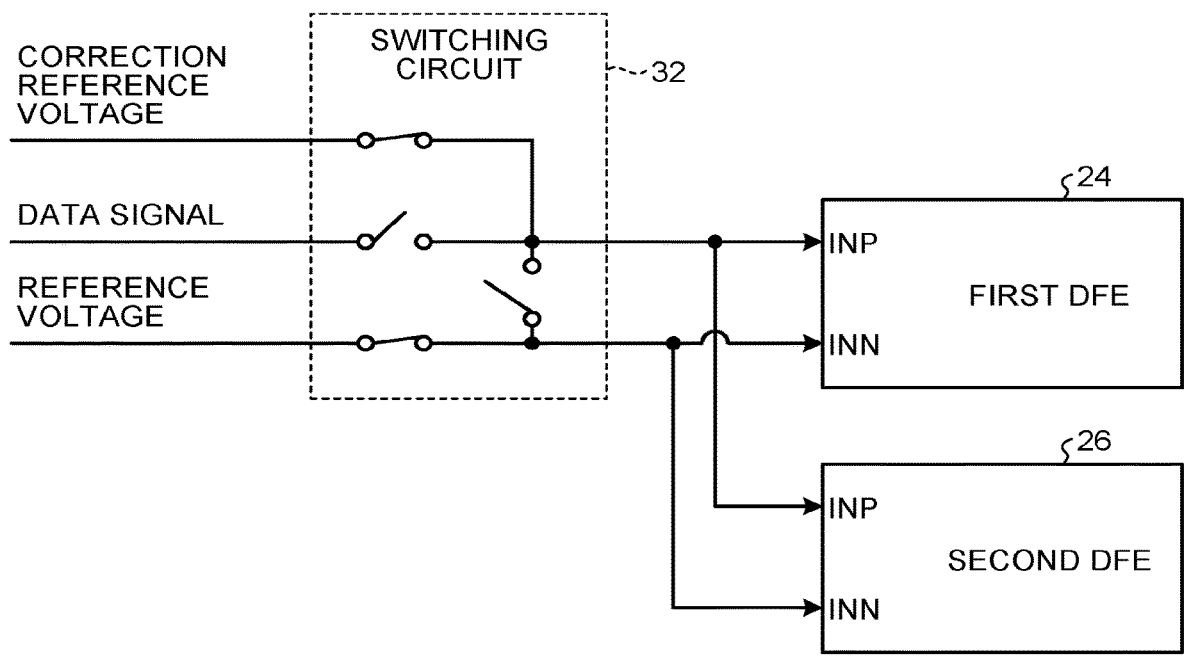
FIG. 11 is a diagram illustrating a connection state caused by the switching circuit at the time of the tap coefficient adjustment.

FIG. 10 is a flowchart illustrating a process of processing at the time of tap coefficient adjustment. FIG. 11 is a diagram illustrating a connection state caused by the switching circuit 32 at the time of the tap coefficient adjustment. At the time of the tap coefficient adjustment, the control circuit 34 executes the processing in accordance with the process illustrated in FIG. 10 in regard to the first decision feedback equalizer 24.

First, in S31, the control circuit 34 controls, as illustrated in FIG. 11, the switching circuit 32, so that the correction reference voltage is supplied to the INP terminal of the first decision feedback equalizer 24 and the reference voltage is supplied to the INN terminal of the first decision feedback equalizer 24. In this manner, the control circuit 34 can cause a state in which the correction reference voltage instead of the voltage of the data signal is supplied to the first decision feedback equalizer 24.

Next, in S32, the control circuit 34 changes the tap coefficient in regard to the first decision feedback equalizer 24 to detect a first inverted tap coefficient which is the tap coefficient at the boundary where the output value is inverted. For example, the control circuit 34 changes the tap coefficient by changing the number of FETs for setting the tap coefficient.

Note that, in this case, the control circuit 34 sets the past output value as 1 for changing the positive-side tap coefficient and sets the past output value as 0 for changing the negative-side tap coefficient.

Next, in S33, the control circuit 34 sets the first inverted tap coefficient detected in S32 as the tap coefficient to the first decision feedback equalizer 24. For example, the control circuit 34 sets the number of FETs at the boundary where the output value is inverted, detected in S32, to the first decision feedback equalizer 24. Then, the control circuit 34 ends the tap coefficient adjustment processing by ending the processing in S33.

Note that the control circuit 34 detect a second inverted tap coefficient and sets the second inverted tap coefficient as the tap coefficient to the second decision feedback equalizer 26 in the same manner.

Figure 12:
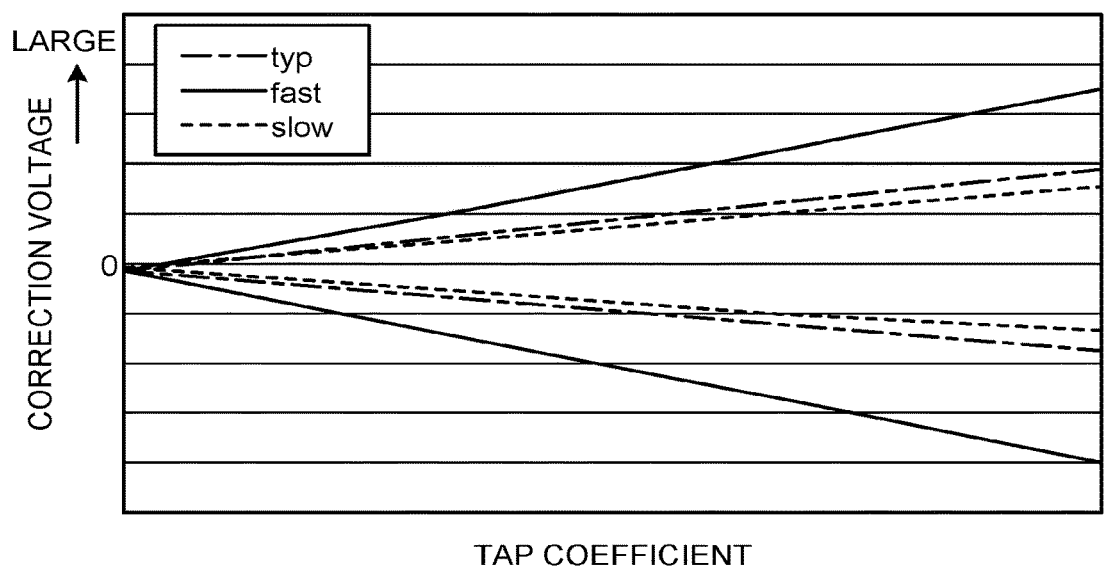
FIG. 12 is a diagram illustrating an example of a relation of a correction voltage with respect to the tap coefficient.

FIG. 12 is a diagram illustrating an example of a relation of a correction voltage with respect to the tap coefficient.

For example, in the case of using the first decision feedback equalizer 24 and the second decision feedback equalizer 26 each having a circuit configured by the MOSFETs as illustrated in FIG. 4 and FIG. 5, the tap coefficient is achieved by the mutual conductance (gm) of the third FET 72 and the fourth FET 76. For example, as illustrated in FIG. 12, even if the identical tap coefficient (identical number of FETs) is set, a value of the correction voltage to be added or subtracted to or from the voltage of the data signal varies depending on a difference in a Vth voltage (threshold voltage) of the MOSFETs due to a variation in PVT. For example, as illustrated in FIG. 12, the difference may be caused between a case where the Vth voltage of transistor is low (fast) and a case where the Vth voltage of transistor is high (slow).

On the other hand, the reception device 20 according to the present embodiment changes the tap coefficient in a state in which the correction reference voltage, instead of the voltage of the data signal, is supplied to each of the first decision feedback equalizer 24 and the second decision feedback equalizer 26 before the data signal is received, to detect the inverted tap coefficient for inverting the output value. Then, the reception device 20 sets the inverted tap coefficient as the tap coefficient to the first decision feedback equalizer 24 and the second decision feedback equalizer 26 at the time of receiving the data signal. This enables the reception device 20 according to the present embodiment to compare the voltage obtained by adding or subtracting the appropriate correction voltage to or from the voltage of the data signal and the reference voltage at the time of receiving the data signal. Thus, the reception device 20 according to the present embodiment can receive the data signal with high accuracy.

Figure 13:
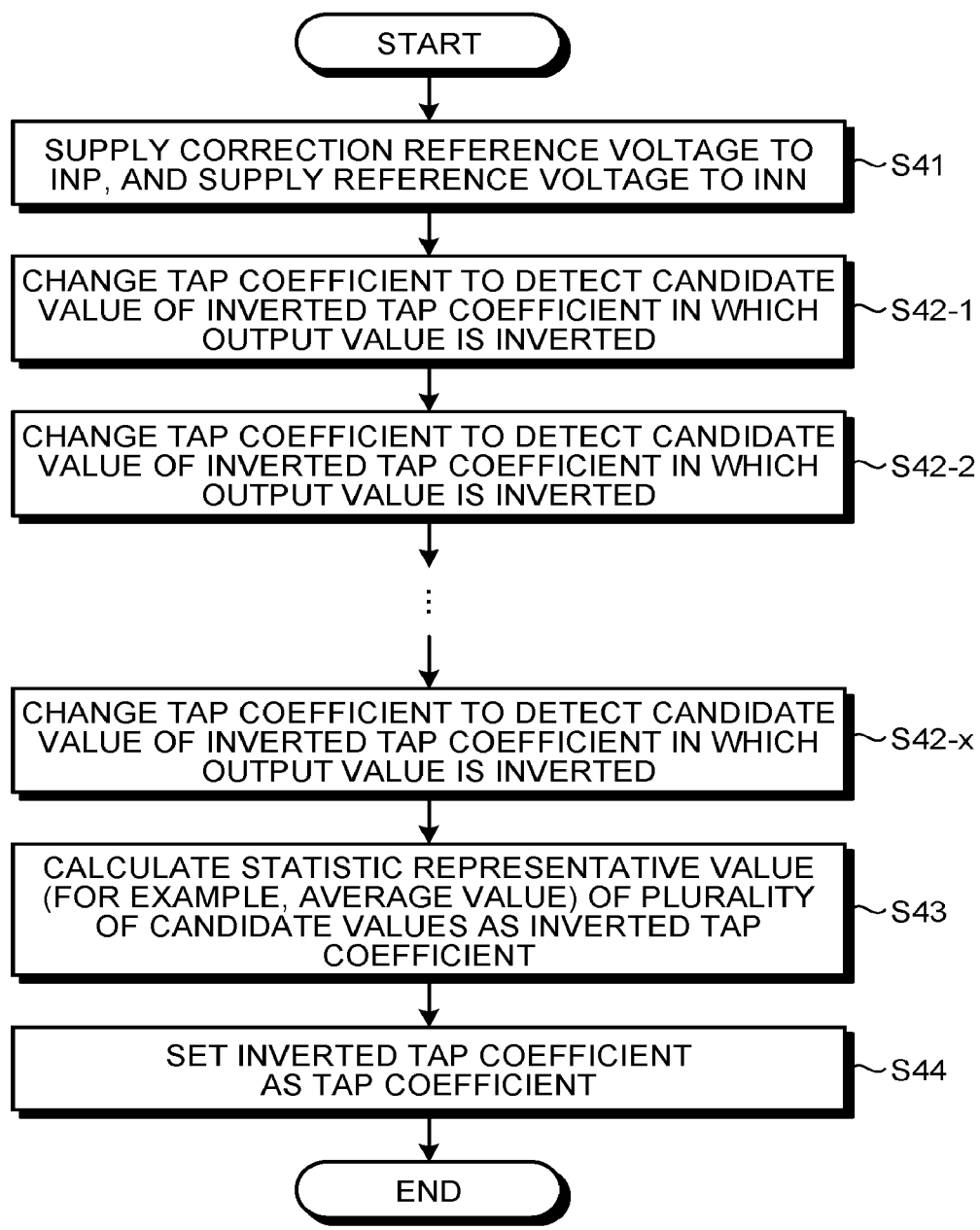
FIG. 13 is a flowchart illustrating a process of processing at the time of the tap coefficient adjustment according to a first modification.

FIG. 13 is a flowchart illustrating a process of processing at the time of the tap coefficient adjustment according to a first modification.

The control circuit 34 may execute the processing in accordance with the process illustrated in FIG. 13 in regard to the first decision feedback equalizer 24 at the time of the tap coefficient adjustment. In this case, the control circuit 34 executes the same processing in regard to the second decision feedback equalizer 26.

First, in S41, the control circuit 34 controls the switching circuit 32, so that the correction reference voltage is supplied to the INP terminal of the first decision feedback equalizer 24 and the reference voltage is supplied to the INN terminal of the first decision feedback equalizer 24. S41 is the same as S31 in FIG. 10.

Next, in S42, the control circuit 34 changes the tap coefficient in regard to the first decision feedback equalizer 24 to detect, a plurality of times, candidate values of an inverted tap coefficient which is the tap coefficient at the boundary where the output value is inverted. For example, the control circuit 34 detects candidate values of the inverted tap coefficient x times (x is an integer of 2 or more) (S42-1 to S42-x).

Next, in S43, the control circuit 34 calculates a statistic representative value of a plurality of the candidate values as a first inverted tap coefficient. For example, the control circuit 34 calculates an average value of the plurality of the candidate values. Alternatively, the control circuit 34 may calculate the median or average, the most frequent value, or the like of the plurality of the candidate values.

Next, in S44, the control circuit 34 sets the first inverted tap coefficient calculated in S43 (the statistic representative value of the plurality of the candidate values) as the tap coefficient to the first decision feedback equalizer 24. Then, the control circuit 34 ends the tap coefficient adjustment processing by ending the processing in S44.

The control circuit 34 can reduce an error for detecting the inverted tap coefficient by executing the above tap coefficient adjustment according to the first modification, thereby allowing the data signal to be received with high accuracy.

Figure 14:
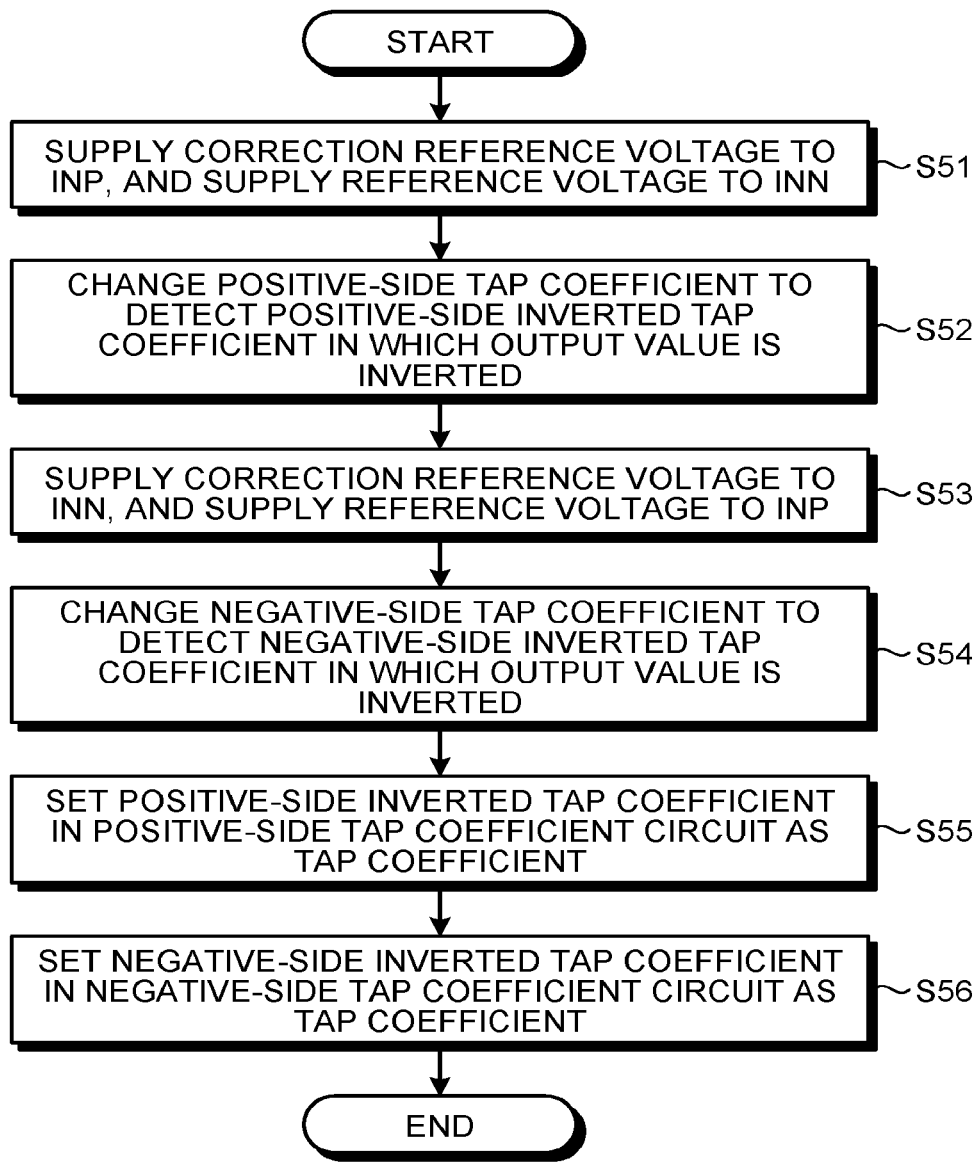
FIG. 14 is a flowchart illustrating a process of processing at the time of the tap coefficient adjustment according to a second modification.
Figure 15:
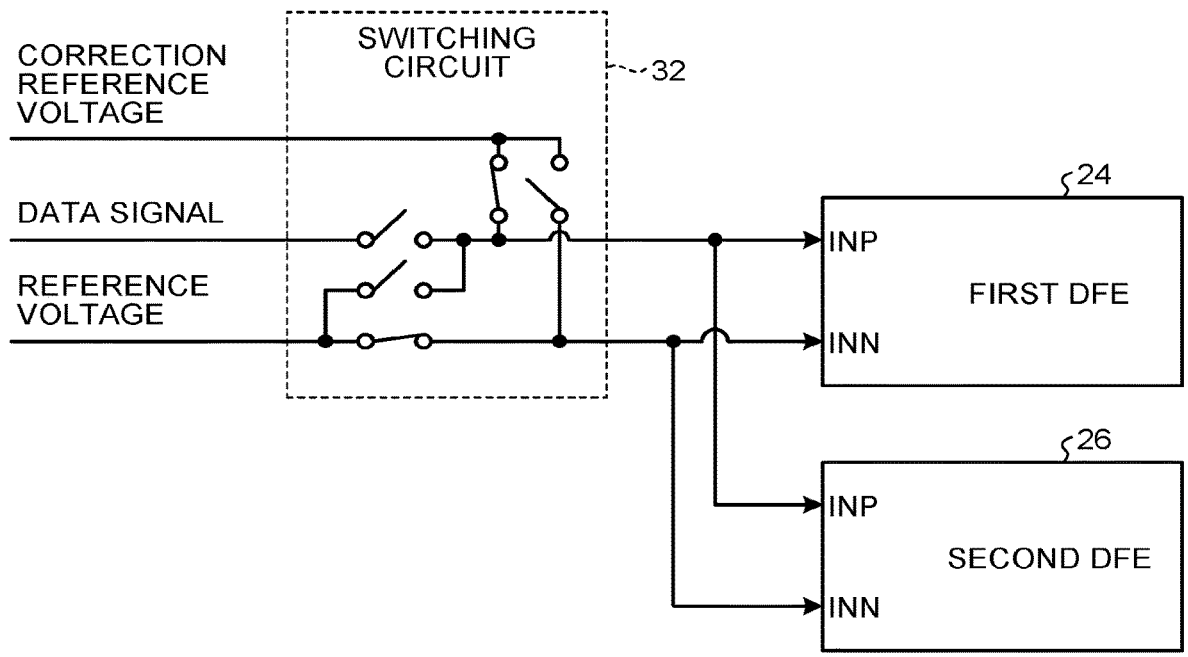
FIG. 15 is a diagram illustrating a connection state caused by the switching circuit at the time of positive-side tap coefficient adjustment of the second modification.
Figure 16:
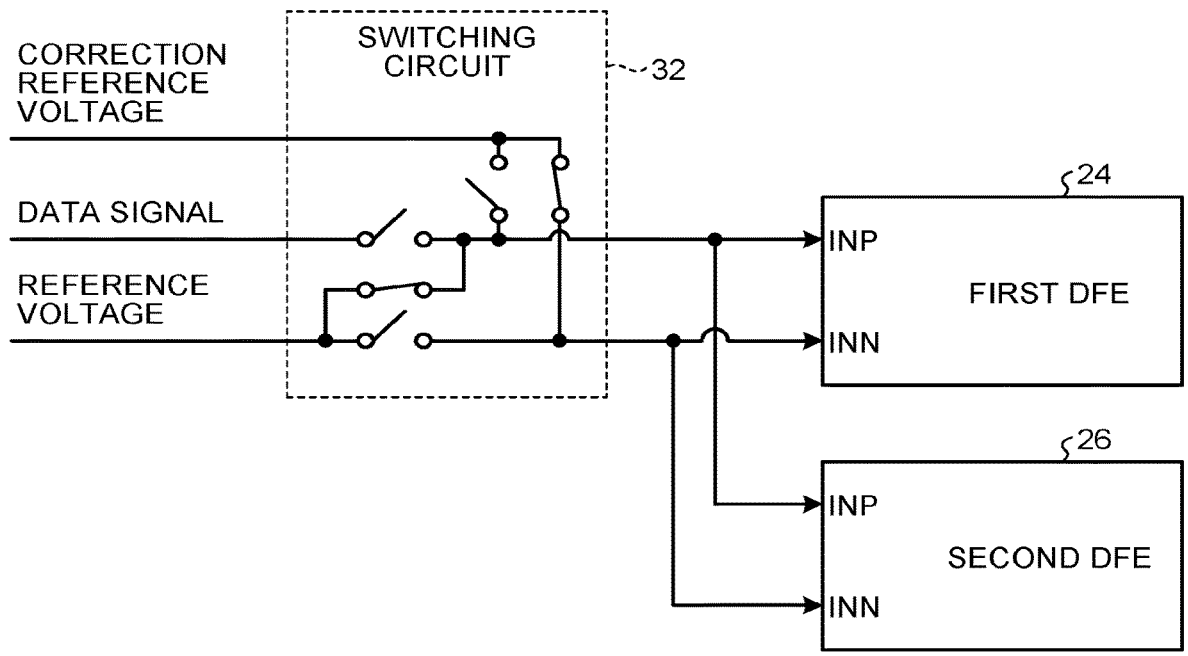
FIG. 16 is a diagram illustrating a connection state caused by the switching circuit at the time of negative-side tap coefficient adjustment of the second modification.

FIG. 14 is a flowchart illustrating a process of processing at the time of the tap coefficient adjustment according to a second modification. FIG. 15 is a diagram illustrating a connection state caused by the switching circuit 32 at the time of positive-side tap coefficient adjustment of the second modification. FIG. 16 is a diagram illustrating a connection state caused by the switching circuit 32 at the time of negative-side tap coefficient adjustment of the second modification.

The control circuit 34 may execute the processing in accordance with the process illustrated in FIG. 14 in regard to the first decision feedback equalizer 24 at the time of the tap coefficient adjustment. In this case, the control circuit 34 executes the same processing in regard to the second decision feedback equalizer 26.

First, in S51, the control circuit 34 controls, as illustrated in FIG. 15, the switching circuit 32, so that the correction reference voltage is supplied to the INP terminal of the first decision feedback equalizer 24 and the reference voltage is supplied to the INN terminal of the first decision feedback equalizer 24. In this manner, the control circuit 34 can cause a state in which the correction reference voltage instead of the voltage of the data signal is supplied to the first decision feedback equalizer 24. S51 is the same as S31 in FIG. 10.

Next, in S52, the control circuit 34 changes the positive-side tap coefficient in regard to the first decision feedback equalizer 24 to detect a positive-side inverted tap coefficient which is the tap coefficient at the boundary where the output value is inverted. For example, the control circuit 34 changes the number of FETs for setting the positive-side tap coefficient. Note that, in this case, the control circuit 34 sets the past output value as 1 in order to change the positive-side tap coefficient.

Next, in S53, the control circuit 34 controls, as illustrated in FIG. 16, the switching circuit 32, so that the reference voltage is supplied to the INP terminal of the first decision feedback equalizer 24 and the correction reference voltage is supplied to the INN terminal of the first decision feedback equalizer 24. In this manner, the control circuit 34 can cause a state in which the correction reference voltage instead of the reference voltage is supplied and the reference voltage instead of the voltage of the data signal is supplied.

Next, in S54, the control circuit 34 changes the negative-side tap coefficient in regard to the first decision feedback equalizer 24 to detect a negative-side inverted tap coefficient which is the negative-side tap coefficient at the boundary where the output value is inverted. For example, the control circuit 34 changes the number of FETs for setting the negative-side tap coefficient. Note that, in this case, the control circuit 34 sets the past output value as 0 in order to change the negative-side tap coefficient.

Next, in S55, the control circuit 34 sets the positive-side inverted tap coefficient detected in S52 as the positive-side tap coefficient to the first decision feedback equalizer 24. For example, the control circuit 34 sets the number of FETs at the boundary where the output value is inverted, detected in S52, to the first decision feedback equalizer 24.

Next, in S56, the control circuit 34 sets the negative-side inverted tap coefficient detected in S54 as the negative-side tap coefficient to the first decision feedback equalizer 24. For example, the control circuit 34 sets the number of FETs at the boundary where the output value is inverted, detected in S54, to the first decision feedback equalizer 24. Then, the control circuit 34 ends the tap coefficient adjustment processing by ending the processing in S56.

Figure 17:
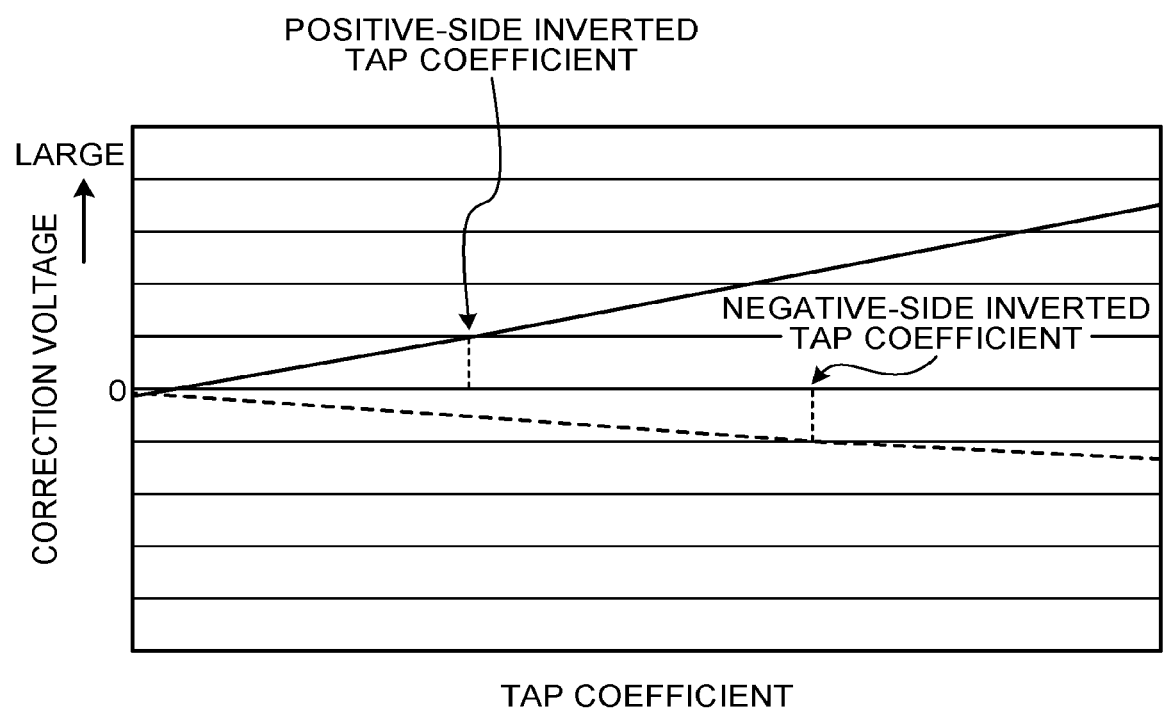
FIG. 17 is a diagram illustrating an example of a positive side correction voltage and a negative side correction voltage with respect to the tap coefficient.

FIG. 17 is a diagram illustrating an example of a positive side correction voltage and a negative side correction voltage with respect to the tap coefficient.

For example, in the case of using the first decision feedback equalizer 24 and the second decision feedback equalizer 26 each having a circuit configured by the MOS-FETs as illustrated in FIG. 4 and FIG. 5, the tap coefficient is achieved by the mutual conductance (gm) of the third FET 72 and the fourth FET 76. The mutual conductance of the third FET 72 and the mutual conductance of the fourth FET 76 may be different from each other. For example, as illustrated in FIG. 17, this difference may cause a difference between an absolute value of the positive side correction voltage and an absolute value of the negative side correction voltage despite setting the identical tap coefficient (gate voltage). That is, as illustrated in FIG. 17, it is possible that the absolute value of the positive side correction voltage and the absolute value of the negative side correction voltage become the same with the different tap coefficients (gate voltages) between the positive side and the negative side.

On the other hand, the reception device 20 according to a second modification changes the tap coefficient independently on the positive side and the negative side to detect the positive-side inverted tap coefficient and the negative-side inverted tap coefficient for inverting the output value. Then, the reception device 20 set the positive-side inverted tap coefficient as the positive-side tap coefficient and the negative-side inverted tap coefficient as the negative-side tap coefficient to the first decision feedback equalizer 24 and the second decision feedback equalizer 26 at the time of receiving the data signal. This enables the reception device 20 according to the present embodiment to compare the voltage obtained by adding or subtracting the appropriate correction voltage to or from the voltage of the data signal and the reference voltage at the time of receiving the data signal regardless of whether the correction voltage is a positive value or a negative value. Thus, the reception device 20 according to the present embodiment can receive the data signal with high accuracy.

Figure 18:
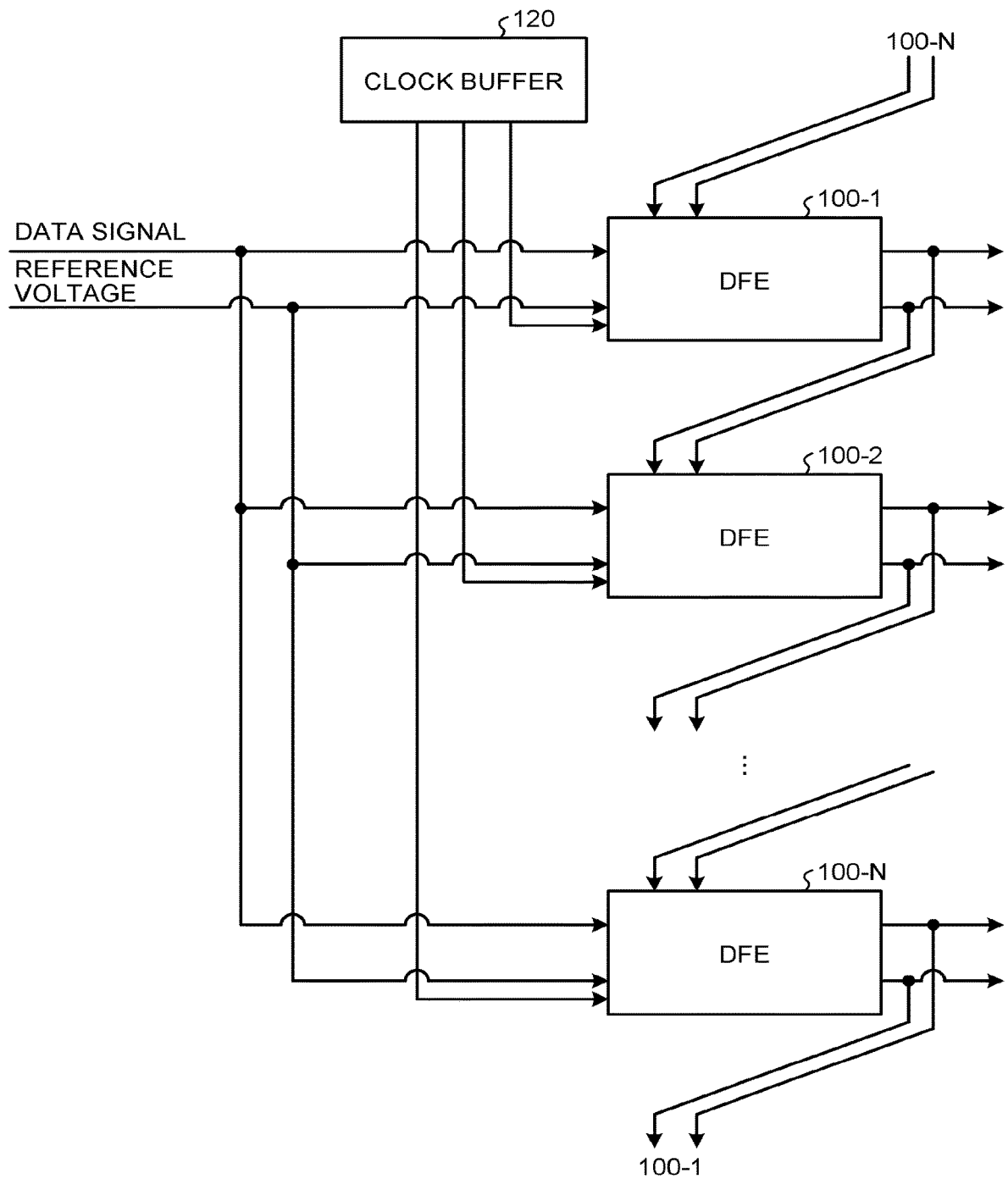
FIG. 18 is a diagram illustrating a connection example of N units of the decision feedback equalizers according to a third modification.

FIG. 18 is a diagram illustrating a connection example of N units of the decision feedback equalizers 100 according to a third modification.

The reception device 20 according to the third modification may include the first to Nth (N is an integer of 3 or more) decision feedback equalizers 100 (100-1 to 100-N) (N units) instead of the first decision feedback equalizer 24 and the second decision feedback equalizer 26. Each of N units of the decision feedback equalizers 100 has the same configuration as that of the first decision feedback equalizer 24 and the second decision feedback equalizer 26. Each of N units of the decision feedback equalizers 100 outputs an output value representing a result obtained by comparing the reference voltage and a voltage obtained by adding or subtracting the correction voltage to or from the voltage of the data signal.

In the case of including N units of the decision feedback equalizers 100, a clock buffer 120 outputs the first to Nth internal clock signals (N units). Each of N units of the internal clock signals has a cycle N times that of the clock signal embedded in the data signal. N units of the internal clock signals have phases sequentially shifted by 1/N cycle. The first decision feedback equalizer 100-1 acquires a first internal clock signal as the clock signal. The second decision feedback equalizer 100-2 acquires a second internal clock signal whose phase is shifted by 1/N cycle from the first internal clock signal as the clock signal. Then, the Nth decision feedback equalizer 100-N acquires an Nth internal clock signal whose phase is shifted by 1/N cycle from an (N−1)th internal clock signal as the clock signal.

Each of N units of the decision feedback equalizers 100 acquires an output value output at the clock timing immediately before in the data signal as the past output value. The nth decision feedback equalizer 100-n (n is an integer of 1 or more and N or less) among the N units of the decision feedback equalizers 100 outputs an output value at each (R+1)th (R is a remainder obtained by dividing the total number of samples by N) sampling timing.

The control circuit 34 changes the tap coefficient in a state in which the correction reference voltage, instead of the voltage of the data signal, is supplied to the nth decision feedback equalizer 100-n before the data signal is received, to detect an nth inverted tap coefficient which is the tap coefficient at the boundary where the output value is inverted. Then, the control circuit 34 set the nth inverted tap coefficient as the tap coefficient to the nth decision feedback equalizer 100-n at the time of receiving the data signal.

The reception device 20 having such a configuration can output the output value representing the value of the data signal with high accuracy by N units of the decision feedback equalizers 100.

Note that the reception device 20 may include one unit of the decision feedback equalizer 100 instead of the first decision feedback equalizer 24 and the second decision feedback equalizer 26. In this case, the clock buffer 120 outputs the internal clock signal having the same cycle as that of the clock signal embedded in the data signal. Then, the decision feedback equalizer 100 acquires the internal clock signal having the same cycle as that of the clock signal embedded in the data signal as the clock signal. Further, in this case, the decision feedback equalizer 100 acquires the output value outputted one sample before by itself as the past output value. The reception device 20 having such a configuration can also output the output value representing the value of the data signal with high accuracy.

Each of N units of the decision feedback equalizers 100 is configured to acquire the output value outputted one sample before. However, each of N units of the decision feedback equalizers 100 may further acquire one or more output values outputted two or more samples before in addition to the output value outputted one sample before. Then, each of N units of the decision feedback equalizers 100 may calculate the correction voltage by multiplying each of one or more output values outputted two or more samples before by the tap coefficient independently set and then further add or subtract the correction voltage to or from the voltage of the data signal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reception device configured to receive a data signal representing a data value 0 or 1, the reception device comprising:
   an equalizer circuit configured to output an output value representing a result obtained by comparing a voltage based on the received data signal and a first voltage as a reference, at each clock timing corresponding to the data signal; and
   a control circuit connected to the equalizer circuit,
   the control circuit being configured to:
   change, before the data signal is received, a tap coefficient related to a characteristic of the equalizer circuit in a state in which a second voltage different from the first voltage, instead of the voltage of the data signal, is supplied to the equalizer circuit, to detect an inverted tap coefficient that is the tap coefficient at a boundary where a data value of the output value is inverted; and
   set, at a time of receiving the data signal, the inverted tap coefficient to the equalizer circuit.

2. The reception device according to claim 1, wherein the second voltage is a voltage obtained by adding an interference voltage to the first voltage, the interference voltage being a voltage added to the data signal when the output value outputted at a past clock timing is 1.

3. The reception device according to claim 1, wherein the control circuit is configured to:
   detect candidate values of the inverted tap coefficient a plurality of times before the data signal is received; and
   set a statistic representative value based on the candidate values of the inverted tap coefficient to the equalizer circuit at the time of receiving the data signal.

4. The reception device according to claim 1, wherein the equalizer circuit is configured to alternately repeat a reset period and a comparison period, and
   the equalizer circuit includes:
   an amplification circuit configured to amplify and output a voltage based on the first voltage and on a voltage obtained by adding or subtracting a correction voltage to or from the voltage of the data signal in the comparison period, the correction voltage being a voltage obtained by multiplying the tap coefficient by a past output value that is the output value outputted at the past clock timing; and
   a latch circuit configured to pre-charge to stray capacitance in the reset period, and keep and output a value of a differential amplified signal in the comparison period.

5. The reception device according to claim 4, wherein the amplification circuit comprises:
   a first FET in which the voltage of the data signal is applied to a gate;
   a second FET in which the first voltage is applied to a gate;
   a first switch configured to connect a source of the first FET and a source of the second FET to a power potential in the comparison period, and to disconnect the source of the first FET and the source of the second FET from the power potential in the reset period;
   a second switch configured to connect a drain of the first FET to a ground potential in the reset period, and to disconnect the drain of the first FET from the ground potential in the comparison period;
   a third switch configured to connect a drain of the second FET to the ground potential in the reset period, and to disconnect the drain of the second FET from the ground potential in the comparison period;
   a positive-side tap coefficient circuit that is connected in parallel with the drain and the source of the second FET; and
   a negative-side tap coefficient circuit that is connected in parallel with the drain and the source of the first FET, wherein the positive-side tap coefficient circuit is configured to connect the drain and the source of the second FET with a resistance value according to the tap coefficient when the past output value is 1, and to disconnect between the drain and the source of the second FET when the past output value is 0, and the negative-side tap coefficient circuit is configured to connect the drain and the source of the first FET with a resistance value according to the tap coefficient when the past output value is 0, and to disconnect between the drain and the source of the first FET when the past output value is 1.

6. The reception device according to claim 5, wherein the positive-side tap coefficient circuit includes:

a third FET that includes a plurality of FET elements; and a fourth switch, wherein a drain and a source of the third FET and the fourth switch are connected in series, the fourth switch is configured to make a short circuit when the past output value is 1 and to cause disconnection when the past output value is 0, and in the third FET, a resistance value between the drain and the source thereof is changed by setting the number of FET elements according to the tap coefficient to a gate thereof by the control circuit and selecting the number of FET elements turned on among the plurality of FET elements in accordance with the number of FET elements set by the control circuit.

7. The reception device according to claim 6, wherein the negative-side tap coefficient circuit includes:

a fourth FET that includes a plurality of FET elements; and a fifth switch, wherein a drain and a source of the fourth FET and the fifth switch are connected in series, the fifth switch is configured to make a short circuit when the past output value is 0 and to cause disconnection when the past output value is 1, and in the fourth FET, a resistance value between the drain and the source thereof is changed by setting the number of FET elements according to the tap coefficient to a gate thereof by the control circuit and selecting the number of FET elements turned on among the plurality of FET elements in accordance with the number of FET elements set by the control circuit.

8. The reception device according to claim 5, wherein the control circuit is configured to:

before the data signal is received, detect a positive-side inverted tap coefficient at the boundary where the data value of the output value is inverted by changing the tap coefficient in a state in which the second voltage, instead of the voltage of the data signal, is supplied to the equalizer circuit;

detect a negative-side inverted tap coefficient at the boundary where the data value of the output value is inverted by changing the tap coefficient in a state in which the second voltage, instead of the first voltage, is supplied and the first voltage, instead of the voltage of the data signal, is supplied to the equalizer circuit;

at the time of receiving the data signal, set the positive-side inverted tap coefficient to the positive-side tap coefficient circuit; and set the negative-side inverted tap coefficient to the negative-side tap coefficient circuit.

9. The reception device according to claim 1, wherein the equalizer circuit includes a first equalizer circuit and a second equalizer circuit, the first equalizer circuit is configured to output the output value at each even-numbered clock timing, the second equalizer circuit is configured to output the output value at each odd-numbered clock timing, and the control circuit is configured to:

before the data signal is received, detect a first inverted tap coefficient that is the tap coefficient at the boundary where the data value of the output value is inverted by changing the tap coefficient in a state in which the second voltage, instead of the voltage of the data signal, is supplied to the first equalizer circuit;

detect a second inverted tap coefficient that is the tap coefficient at the boundary where the data value of the output value is inverted by changing the tap coefficient in a state in which the second voltage, instead of the voltage of the data signal, is supplied to the second equalizer circuit;

at the time of receiving the data signal, set the first inverted tap coefficient to the first equalizer circuit; and set the second inverted tap coefficient to the second equalizer circuit.

10. The reception device according to claim 1, wherein the equalizer circuit includes first to Nth (N is an integer of 2 or more) equalizer circuits, an nth (n is an integer of 1 or more and N or less) decision feedback equalizer is configured to output the output value at each (R+1)th (R is a remainder obtained by dividing a total sample number by N) sampling timing, and the control circuit is configured to:

before the data signal is received, detect an nth inverted tap coefficient that is the tap coefficient at the boundary where the data value of the output value is inverted by changing the tap coefficient in a state in which the second voltage, instead of the voltage of the data signal, is supplied to the nth equalizer circuit; and at the time of receiving the data signal, set the nth inverted tap coefficient to the nth equalizer circuit.

11. A reception method of receiving a data signal representing a data value 0 or 1, the reception method comprising:

outputting, by an equalizer circuit, an output value representing a result obtained by comparing a voltage based on the received data signal and a first voltage as a reference, at each clock timing corresponding to the data signal;

changing, before the data signal is received, a tap coefficient related to a characteristic of the equalizer circuit in a state in which a second voltage different from the first voltage, instead of the voltage of the data signal, is supplied to the equalizer circuit, to detect an inverted tap coefficient that is the tap coefficient at a boundary where a data value of the output value is inverted; and setting, at a time of receiving the data signal, the inverted tap coefficient to the equalizer circuit.

12. The reception method according to claim 11, wherein the second voltage is a voltage obtained by adding an interference voltage to the first voltage, the interference voltage being a voltage added to the data signal when the output value outputted at a past clock timing is 1.

13. The reception method according to claim 11, further comprising:
  detecting candidate values of the inverted tap coefficient a plurality of times before the data signal is received; and
  setting a statistic representative value based on the candidate values of the inverted tap coefficient to the equalizer circuit at the time of receiving the data signal.

14. The reception method according to claim 11, wherein the equalizer circuit is configured to alternately repeat a reset period and a comparison period, and
the equalizer circuit includes:
  an amplification circuit configured to amplify and output a voltage based on the first voltage and on a voltage obtained by adding or subtracting a correction voltage to or from the voltage of the data signal in the comparison period, the correction voltage being a voltage obtained by multiplying the tap coefficient by a past output value that is the output value outputted at the past clock timing; and
  a latch circuit configured to pre-charge to stray capacitance in the reset period, and keep and output a value of a differential amplified signal in the comparison period.

15. The reception method according to claim 14, wherein the amplification circuit comprises:
  a first FET in which the voltage of the data signal is applied to a gate;
  a second FET in which the first voltage is applied to a gate;
  a first switch configured to connect a source of the first FET and a source of the second FET to a power potential in the comparison period, and to disconnect the source of the first FET and the source of the second FET from the power potential in the reset period;
  a second switch configured to connect a drain of the first FET to a ground potential in the reset period, and to disconnect the drain of the first FET from the ground potential in the comparison period;
  a third switch configured to connect a drain of the second FET to the ground potential in the reset period, and to disconnect the drain of the second FET from the ground potential in the comparison period;
  a positive-side tap coefficient circuit that is connected in parallel with the drain and the source of the second FET; and
  a negative-side tap coefficient circuit that is connected in parallel with the drain and the source of the first FET, wherein
  the positive-side tap coefficient circuit is configured to connect the drain and the source of the second FET with a resistance value according to the tap coefficient when the past output value is 1, and to disconnect between the drain and the source of the second FET when the past output value is 0, and
  the negative-side tap coefficient circuit is configured to connect the drain and the source of the first FET with the resistance value according to the tap coefficient when the past output value is 0, and to disconnect between the drain and the source of the first FET when the past output value is 1.

16. The reception method according to claim 15, wherein the positive-side tap coefficient circuit includes:
  a third FET that includes a plurality of FET elements; and
  a fourth switch, wherein
  a drain and a source of the third FET and the fourth switch are connected in series,
  the fourth switch is configured to make a short circuit when the past output value is 1 and to cause disconnection when the past output value is 0, and
  in the third FET, a resistance value between the drain and the source thereof is changed by setting the number of FET elements according to the tap coefficient to a gate thereof and selecting the number of FET elements turned on among the plurality of FET elements in accordance with the set number of FET elements.

17. The reception method according to claim 16, wherein the negative-side tap coefficient circuit includes:
  a fourth FET that includes a plurality of FET elements; and
  a fifth switch, wherein
  a drain and a source of the fourth FET and the fifth switch are connected in series,
  the fifth switch is configured to make a short circuit when the past output value is 0 and to cause disconnection when the past output value is 1, and
  in the fourth FET, a resistance value between the drain and the source thereof is changed by setting the number of FET elements according to the tap coefficient to a gate thereof and selecting the number of FET elements turned on among the plurality of FET elements in accordance with the set number of FET elements.

18. The reception method according to claim 15, further comprising:
  before the data signal is received,
  detecting a positive-side inverted tap coefficient at the boundary where the data value of the output value is inverted by changing the tap coefficient in a state in which the second voltage, instead of the voltage of the data signal, is supplied to the equalizer circuit;
  detecting a negative-side inverted tap coefficient at the boundary where the data value of the output value is inverted by changing the tap coefficient in a state in which the second voltage, instead of the first voltage, is supplied and the first voltage, instead of the voltage of the data signal, is supplied to the equalizer circuit;
  at the time of receiving the data signal,
  setting the positive-side inverted tap coefficient to the positive-side tap coefficient circuit; and
  setting the negative-side inverted tap coefficient to the negative-side tap coefficient circuit.

19. The reception method according to claim 11, wherein the equalizer circuit includes a first equalizer circuit and a second equalizer circuit,
the first equalizer circuit is configured to output the output value at each even-numbered clock timing,
the second equalizer circuit is configured to output the output value at each odd-numbered clock timing, and
the method further comprises:
  before the data signal is received,
  detecting a first inverted tap coefficient that is the tap coefficient at the boundary where the data value of the output value is inverted by changing the tap coefficient in a state in which the second voltage, instead of the voltage of the data signal, is supplied to the first equalizer circuit;
  detecting a second inverted tap coefficient that is the tap coefficient at the boundary where the data value of the output value is inverted by changing the tap coefficient in a state in which the second voltage, instead of the voltage of the data signal, is supplied to the second equalizer circuit; and at the time of receiving the data signal, setting the first inverted tap coefficient to the first equalizer circuit; and setting the second inverted tap coefficient to the second equalizer circuit.

20. The reception method according to claim 11, wherein the equalizer circuit includes first to Nth (N is an integer of 2 or more) equalizer circuits, an nth (n is an integer of 1 or more and N or less) decision feedback equalizer is configured to output the output value at each (R+1)th (R is a remainder obtained by dividing a total sample number by N) sampling timing, and the method further comprises:

detecting, before the data signal is received, an nth inverted tap coefficient that is the tap coefficient at the boundary where the data value of the output value is inverted by changing the tap coefficient in a state in which the second voltage, instead of the voltage of the data signal, is supplied to the nth equalizer circuit; and setting, at the time of receiving the data signal, the nth inverted tap coefficient to the nth equalizer circuit.

\* \* \* \* \*